US012472285B2

United States Patent
Camci-Unal et al.

(10) Patent No.: US 12,472,285 B2
(45) Date of Patent: Nov. 18, 2025

(54) EGGSHELL PARTICLE CONTAINING HYDROGELS AND PREPOLYMER COMPOSITIONS FOR BIOMEDICAL APPLICATIONS

(71) Applicant: University of Massachusetts, Boston, MA (US)

(72) Inventors: Gulden Camci-Unal, Boston, MA (US); Xinchen Wu, Boston, MA (US)

(73) Assignee: University of Massachusetts, Boston, MA (US)

( * ) Notice: Subject to any disclaimer, the term of this patent is extended or adjusted under 35 U.S.C. 154(b) by 732 days.

(21) Appl. No.: 17/423,266

(22) PCT Filed: Jan. 15, 2020

(86) PCT No.: PCT/US2020/013654
§ 371 (c)(1),
(2) Date: Jul. 15, 2021

(87) PCT Pub. No.: WO2020/150332
PCT Pub. Date: Jul. 23, 2020

(65) Prior Publication Data
US 2022/0125996 A1    Apr. 28, 2022

Related U.S. Application Data

(60) Provisional application No. 62/792,669, filed on Jan. 15, 2019.

(51) Int. Cl.
*A61L 27/48* (2006.01)
*A61K 35/32* (2015.01)
(Continued)

(52) U.S. Cl.
CPC .............. *A61L 27/48* (2013.01); *A61K 35/32* (2013.01); *A61L 27/52* (2013.01); *A61P 19/08* (2018.01)

(58) Field of Classification Search
CPC ...... A61L 27/48; A61L 27/52; A61L 2300/62; A61L 2300/64; A61L 2400/12;
(Continued)

(56) References Cited

U.S. PATENT DOCUMENTS

| 3,558,771 A | 1/1971 | Balassa |
| 5,733,563 A | 3/1998 | Fortier |

(Continued)

FOREIGN PATENT DOCUMENTS

| CN | 107837243 A | 3/2018 |
| CN | 108136073 A | 6/2018 |

(Continued)

OTHER PUBLICATIONS

Neunzehn, Jörg, Thomas Szuwart, and Hans-Peter Wiesmann. "Eggshells as natural calcium carbonate source in combination with hyaluronan as beneficial additives for bone graft materials, an in vitro study." Head & Face Medicine 11 (2015): 1-10. (Year: 2015).*

(Continued)

*Primary Examiner* — Isaac Shomer
(74) *Attorney, Agent, or Firm* — Hamilton, Brook, Smith & Reynolds, P.C.

(57) ABSTRACT

Hydrogels and hydrogel prepolymer compositions are described which include micronized eggshell particles. The hydrogels have outstanding tunability in physical, chemical, and biological properties, and have favorable properties for biomedical applications. They enable tissue formation and regeneration and are suitable for applications involving mineralized tissues such as bone, cartilage, tooth, and tendon, as well as non-mineralized tissues.

24 Claims, 21 Drawing Sheets
Specification includes a Sequence Listing.

(51) Int. Cl.
*A61L 27/52* (2006.01)
*A61P 19/08* (2006.01)

(58) Field of Classification Search
CPC ..... A61L 2430/02; A61K 35/32; A61P 19/08; C08L 89/00
See application file for complete search history.

(56) References Cited

U.S. PATENT DOCUMENTS

| | | | |
|---|---|---|---|
| 6,030,635 A | 2/2000 | Gertzman et al. | |
| 6,326,018 B1 | 12/2001 | Gertzman et al. | |
| 7,045,141 B2 | 5/2006 | Merboth et al. | |
| 7,057,019 B2 | 6/2006 | Pathak | |
| 8,148,501 B2 | 4/2012 | Benecke et al. | |
| 2003/0114552 A1* | 6/2003 | Schacht | A61L 27/54 523/113 |
| 2004/0002456 A1* | 1/2004 | Pathak | A61P 7/08 527/207 |
| 2005/0147643 A1 | 7/2005 | Hunter et al. | |
| 2017/0319629 A1* | 11/2017 | Schmidt | A61L 31/005 |
| 2018/0071433 A1* | 3/2018 | Abdalla | A61L 27/3608 |

FOREIGN PATENT DOCUMENTS

| | | | | |
|---|---|---|---|---|
| CN | 109010896 A | * | 12/2018 | ............. A61K 47/36 |
| EP | 1142596 A | | 10/2001 | |
| FR | 2746652 A | | 10/1997 | |
| KR | 20050073771 A | | 7/2005 | |
| WO | WO2012/036645 A2 | | 3/2012 | |
| WO | WO 2013/075003 A1 | | 5/2013 | |
| WO | WO2014/021797 A2 | | 2/2014 | |
| WO | WO 2014/135598 A2 | | 9/2014 | |
| WO | WO2015/187110 A2 | | 12/2015 | |
| WO | WO 2016/126852 A1 | | 8/2016 | |

OTHER PUBLICATIONS

Sadat-Shojai, Mehdi, Mohammad-Taghi Khorasani, and Ahmad Jamshidi. "3-Dimensional cell-laden nano-hydroxyapatite/protein hydrogels for bone regeneration applications." Materials Science and Engineering: C 49 (2015): 835-843. (Year: 2015).*
Utech, S., Boccaccini, A.R. A review of hydrogel-based composites for biomedical applications: enhancement of hydrogel properties by addition of rigid inorganic fillers. J Mater Sci 51, 271-310 (2016). https://doi.org/10.1007/s10853-015-9382-5 (Year: 2016).*
Choi, Jawun, et al. "Preparation and characterization of eggshell membrane/PVA hydrogel via electron beam irradiation technique." Journal of industrial and engineering chemistry 47 (2017): 41-45. (Year: 2017).*
TC Lai, J Yu, and WB Tsai. "Gelatin methacrylate/carboxybetaine methacrylate hydrogels with tunable crosslinking for controlled drug release." Journal of Materials Chemistry B, vol. 4, 2016, pp. 2304-2313. (Year: 2016).*
English Translation of CN 109010896 A. Originally published in Chinese on Dec. 18, 2018, pp. 1-14. (Year: 2018).*
Krithiga et al. "Preparation and Characterization of a Novel Bone Graft Composite Containing Bone Ash and Egg Shell Powder," Feb. 1, 2011 (Feb. 1, 2011), vol. 34, No., 1, pp. 177-181. (Year: 2011).*
Karimizarandi L. "Synthesize and Characterization of Silk Fibroin/Chitosan/Eggshell Hybrid Scaffold and Biofilm," Thesis, Near East University, Dec. 31, 2018, pp. 1-73. (Year: 2018).*
Marcos Vinícius A. Queirós, Maslândia N. Bezerra and Judith p. A. Feitosa. "Composite Superabsorbent Hydrogel of Acrylic Copolymer and Eggshell: Effect of Biofiller Addition." Journal of the Brazilian Chemical Society, vol. 28 No. 10, 2017, pp. 2004-2012. (Year: 2017).*
W.T. Tsai, J.M. Yang, C.W. Lai, Y.H. Cheng, C.C. Lin, and C.W. Yeh. "Characterization and adsorption properties of eggshells and eggshell membrane." Bioresource Technology, vol. 97, 2006, pp. 488-493. (Year: 2006).*

Abdulrahman, I., Hamzat Ibiyeye Tijani, Bashir Abubakar Mohammed, Haruna Saidu, Hindatu Yusuf, Mohammed Ndejiko Jibrin, and Sulaiman Mohammed: From Garbage to Biomaterials: An Overview on Egg Shell Based Hydroxyapetite. Journal of Materials (2014).
Aubin, J.E., et al., "Osteoblast and chondroblast differentiation". Bone 17(2), Supplement, Aug. 1995, S77-S83.
Bauer, M., L. Kang, Y. Qiu, J. Wu, M. Peng, H.H. Chen, G. Camci-Unal, A.F. Bayomy, D.E. Sosnovik, and A. Khademhosseini: Adult cardiac progenitor cell aggregates exhibit survival benefit both in vitro and in vivo. PLoS One 7, e50491 (2012).
Dupoirieux L, et al., "Comparison of pericranium and eggshell asspace fillers used in combination with guided bone regeneration: An experimental study", Journal of Oral and Maxillofacial Surgery. 2000; 58(1):40-6.
Dupoirieux L, et al., "Powdered eggshell: a pilot study on a newbone substitute for use in maxillofacial surgery", Journal of Cranio-Maxillofacial Surgery. 1995; 23(3):187-94.
Hincke, M., Yves Nyes, Joel Gautron, Marc McKee, Alejandro B Rodriguez-Navarro & and K. Mann: The Eggshell: Structure, Composition and Mineralization. Frontiers in Bioscience (2012).
International Preliminary Report on Patentability for International Application No. PCT/US2020/013654, "Eggshell Particle Containing Hydrogels And Prepolymer Compositions For Biomedical Applications", date of issuance: Jun. 16, 2021.
Karimizarandi, L. "Synthesize and Characterization of Silk Fibroin/Chitosan/Eggshell Hybrid Scaffold and Biofilm," Thesis, Near East University, Dec. 31, 2018, pp. 1-73.
Krithiga et al. "Preparation and Characterization of a Novel Bone Graft Composite Containing Bone Ash and Egg Shell Powder," Feb. 1, 2011 (Feb. 1, 2011), vol. 34, No., 1, pp. 177-181.
Li, Z., H.R. et al., "Chitosan-alginate hybrid scaffolds for bone tissue engineering", Biomaterials 26, 3919-3928 (2005).
Naga, S.M., H.F. El-Maghraby, M. Sayed, and E.A. Saad: Highly Porous Scaffolds Made of Nanosized Hydroxyapetite Powder Synthesized from Eggshells. Journal of Ceramic Science and Technology (2015).
Nichol, J.W., S.T. Koshy, H. Bae, C.M. Hwang, S. Yamanlar, and A. Khademhosseini: Cell-laden microengineered gelatin methacrylate hydrogels. Biomaterials 31, 5536-5544 (2010).
Notification of Transmittal of The International Search Report and The Written Opinion of the International Searching Authority, or the Declaration for International Application No. PCT/US2020/013654, "Eggshell Particle Containing Hydrogels And Prepolymer Compositions For Biomedical Applications", date of mailing: Apr. 2, 2020.
Park, S.-H., E.S. Gil, H. Shi, H.J. Kim, K. Lee, and D.L. Kaplan: Relationships between degradability of silk scaffolds and osteogenesis. Biomaterials 31, 6162-6172 (2010).
Patel, M. et al., "Biomaterial scaffolds in pediatric tissue engineering". Pediatric research 63, 497-501 (2008).
Paul, A., V. Manoharan, D. Krafft, A. Assmann, J.A. Uquillas, S.R. Shin, A. Hasan, M.A. Hussain, A. Memic, and A.K. Gaharwar: Nanoengineered biomimetic hydrogels for guiding human stem cell osteogenesis in three dimensional microenvironments. Journal of Materials Chemistry B 4, 3544-3554 (2016).
Queiros et al. "Composite Superabsorbent Hydrogel of Acrylic Copolymer and Eggshell: Effect of Blofiller Addition," Journal of the Brazilian Chemical Society, Oct. 1, 2017 (Oct. 1, 2017), vol. 28, No. 10, pp. 2004-2012.
Shi, J., M.M. Xing, and W. Zhong: Development of hydrogels and biomimetic regulators as tissue engineering scaffolds. Membranes 2, 70-90 (2012).
Wu, Shih-Ching, et al., "A hydrothermal synthesis of eggshell and fruit waste extract to produce nanosized hydroxyapatite". Ceramics International 39 (2013) 8183-8188.
Silva, E., L.M.R. de Vasconcellos, B.V. Rodrigues, D.M. dos Santos, S.P. Campana-Filho, F.R. Marciano, T.J. Webster, and A.O. Lobo: PDLLA honeycomb-like scaffolds with a high loading of superhydrophilic graphene/multi-walled carbon nanotubes promote osteoblast in vitro functions and guided in vivo bone regeneration. Materials Science and Engineering: C 73, 31-39 (2017).
Swingle, K. et al., "Phases of the inflammatory response to subcutaneous implantation of a cotton pellet and their modification by

(56) References Cited

OTHER PUBLICATIONS certain antiinflammatory agents", Journal of Pharmacology and Experimental Therapeutics 183, 226-234 (1972).

Todeschi, M.R., et al., "Host cell recruitment patterns by bone morphogenetic protein-2 releasing hyaluronic acid hydrogels in a mouse subcutaneous environment", Regenerative medicine 12, 525-539 (2017).

Wang, F.-S., K. et al., "Temporal and spatial expression of bone morphogenetic proteins in extracorporeal shock wave-promoted healing of segmental defect", Bone 32, 387-396 (2003).

Wu, X., et al., "Eggshell particle-reinforced hydrogels for bone tissue engineering: an orthogonal approach", Biomater. Sci., 2019, 7, 2675-2685.

Yamin, A.R., and Kalyani D.: Naturally Derived Porous Hydroxyapetite/Polymer Biocomposite of Cuttlebone and Eggshell for Dental and Orthopedic Applications. International Journal for Research in Applied Science & Engineering Technology (IJRASET) 3 (2015).

Zhang, X., W. Chang, P. Lee, Y. Wang, M. Yang, J. Li, S.G. Kumbar, and X. Yu: Polymer-ceramic spiral structured scaffolds for bone tissue engineering: effect of hydroxyapatite composition on human fetal osteoblasts. PloS one 9, e85871 (2014).

* cited by examiner

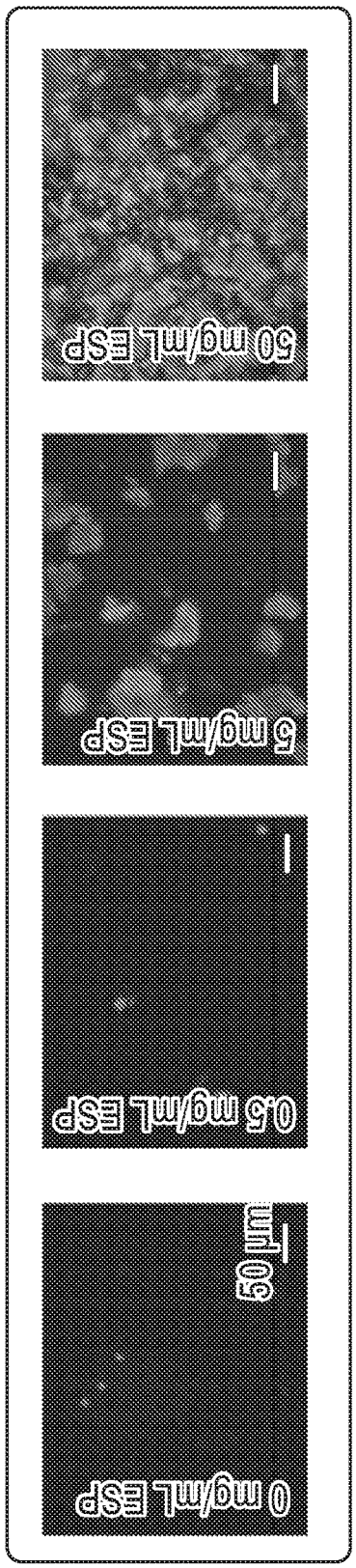
FIG. 1D
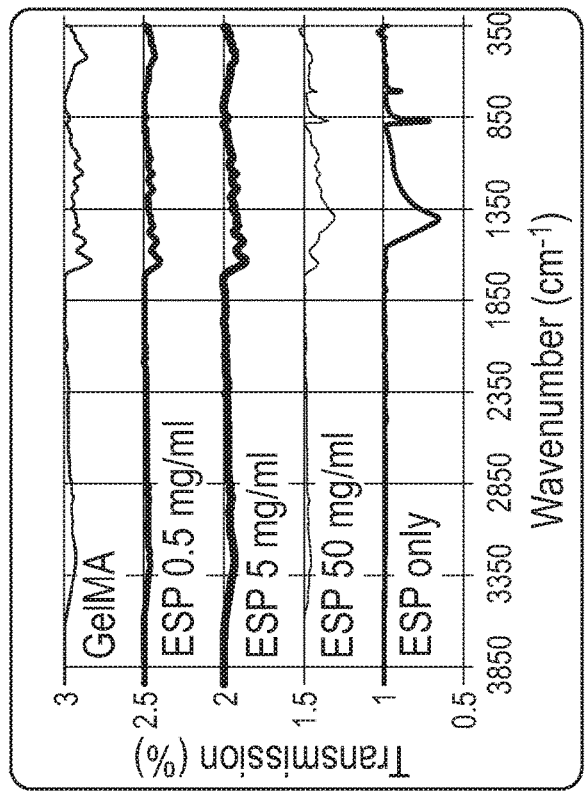
FIG. 1E
| Element | Conc in Sample (μg/g) | Element | Conc in Sample (μg/g) |
|---|---|---|---|
| Ca | 369894.7 | Pb | 53.0 |
| Mg | 2461.0 | Al | 41.0 |
| S | 2415.5 | Zn | 24.0 |
| Na | 1205.0 | P | 4.9 |
| K | 380.0 | Sn | 1.2 |
| Cu | 124.0 | Fe | 1.0 |
| B | 97.3 | | |
FIG. 1F

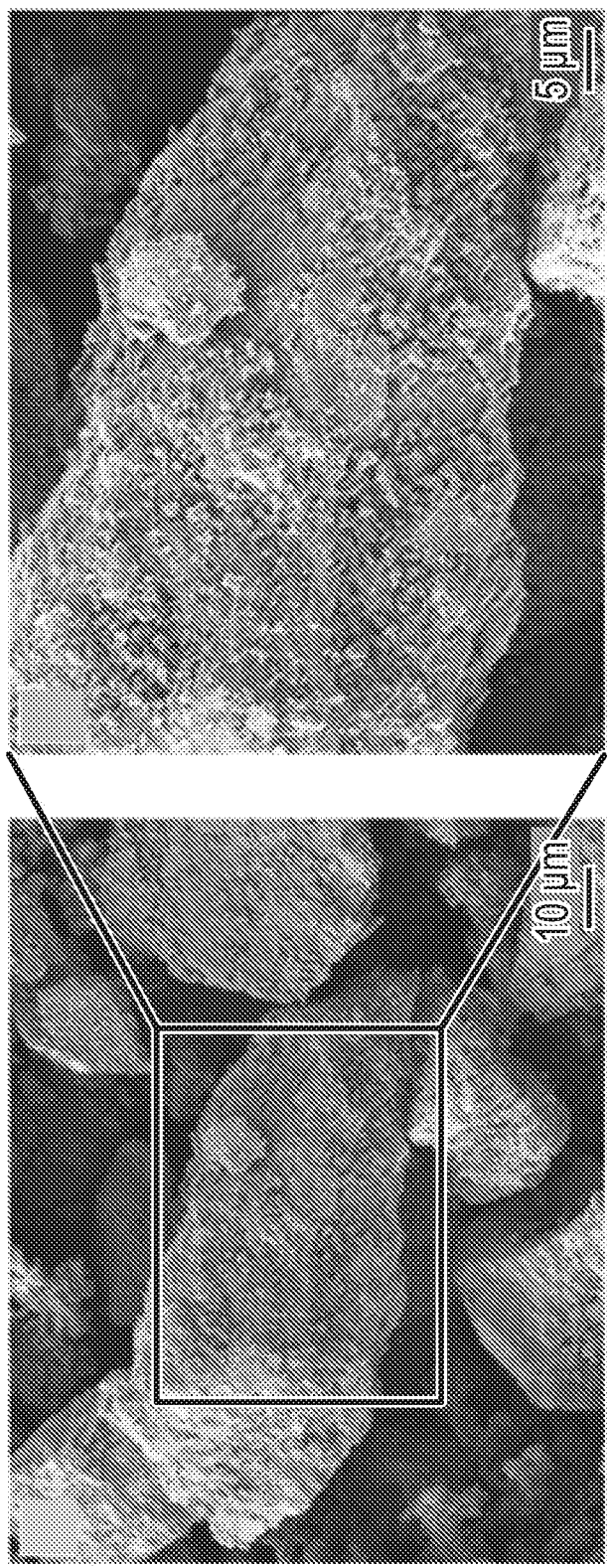

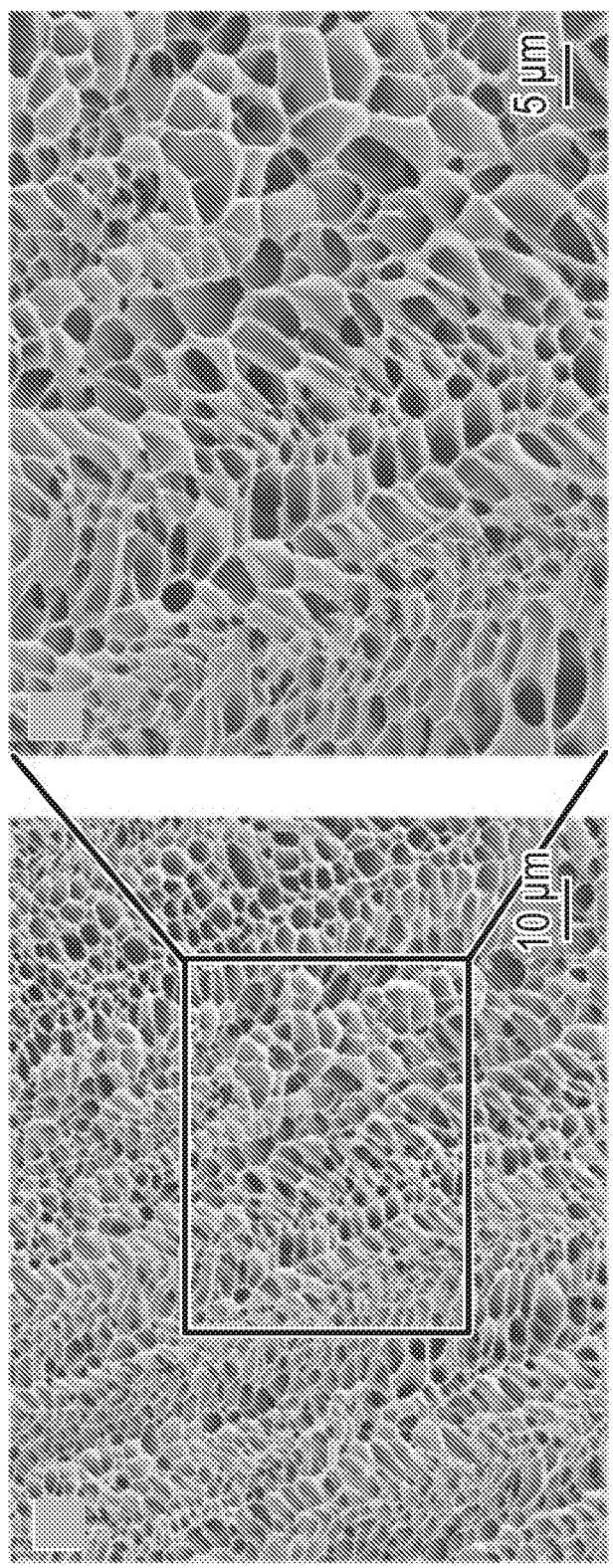

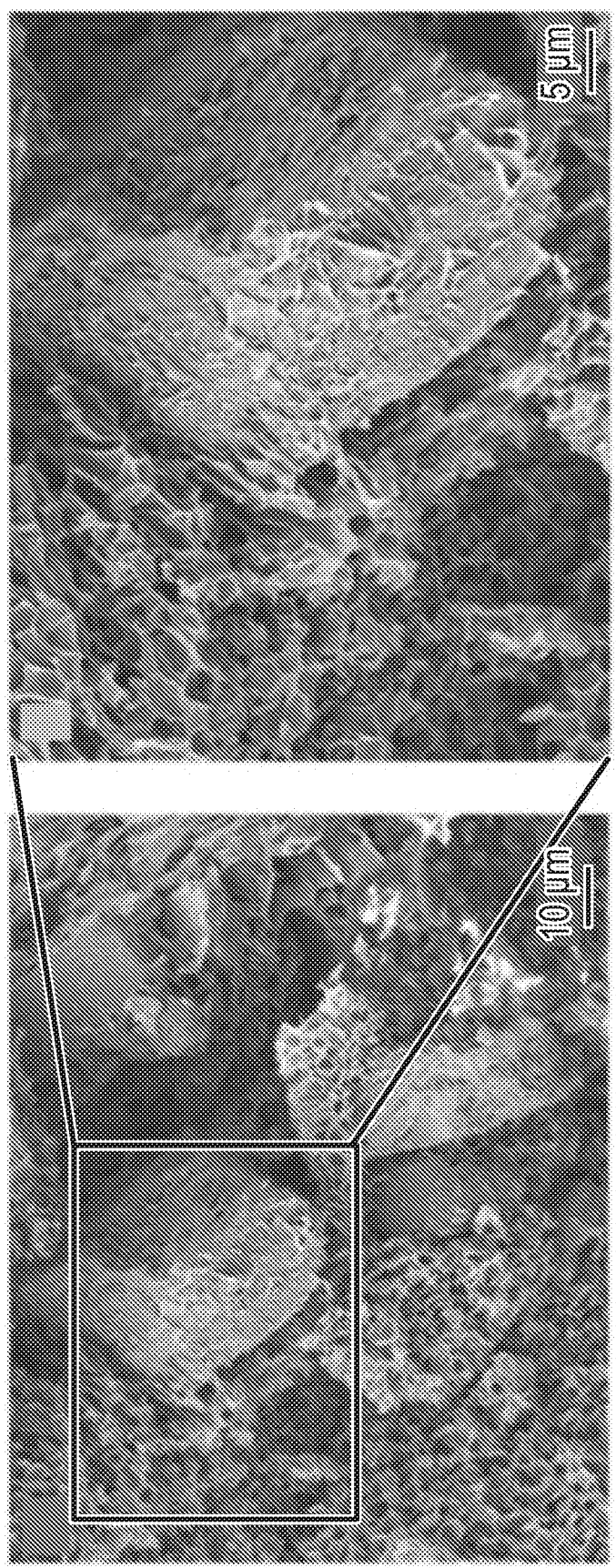

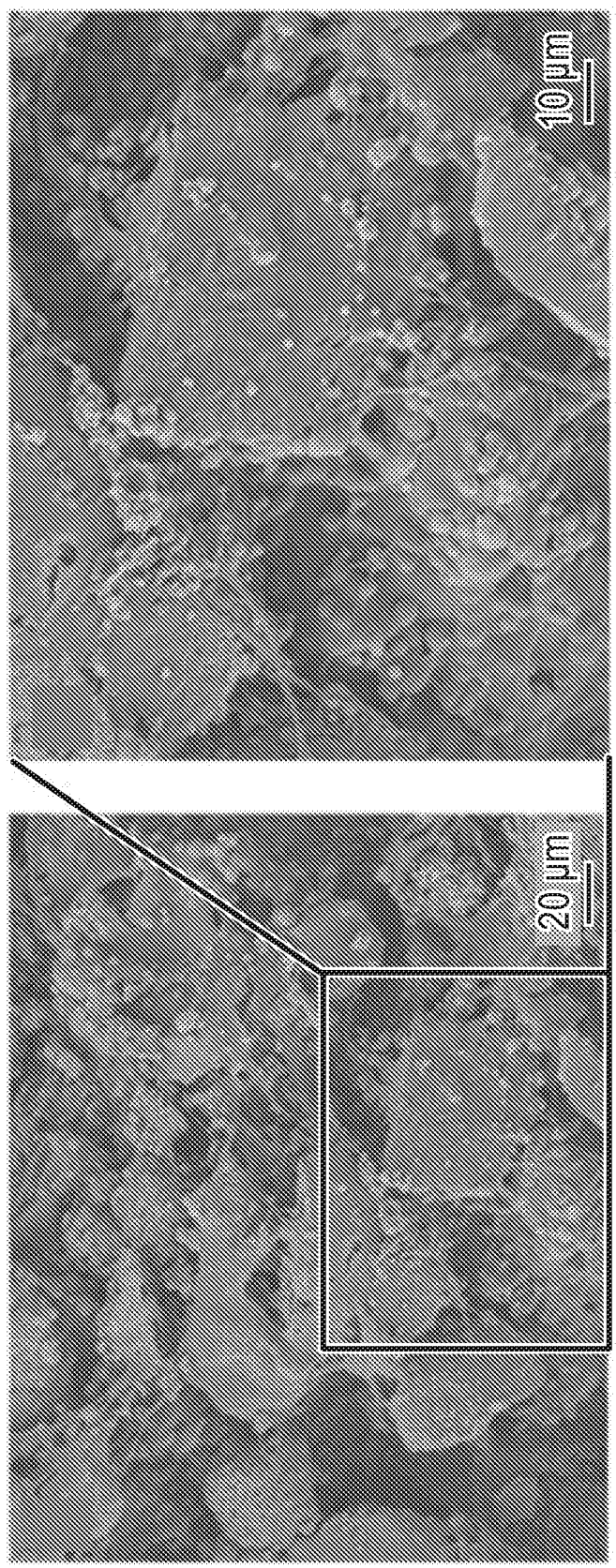

EGGSHELL PARTICLE CONTAINING HYDROGELS AND PREPOLYMER COMPOSITIONS FOR BIOMEDICAL APPLICATIONS

RELATED APPLICATION

This application is the U.S. National Stage of International Application No. PCT/US2020/013654, filed on Jan. 15, 2020, which designates the U.S., published in English, and claims the benefit of U.S. Provisional Application No. 62/792,669, filed on Jan. 15, 2019. The entire teachings of the above applications are incorporated herein by reference.

INCORPORATION BY REFERENCE OF MATERIAL IN ASCII TEXT FILE

This application incorporates by reference the Sequence Listing contained in the following ASCII text file being submitted concurrently herewith:
   a) File name: 08132071002 SEQUENCELISTING.txt; created Jul. 7, 2021, 2 KB in size.

BACKGROUND

Worldwide, more than two million bone graft procedures are performed each year to treat patient defects, including but not limited to cancer, accidents, diseases, and war injuries. Bone repair is crucial to restore patient functionality post-injury. Surgical treatment options are dependent on currently available bone graft materials, which have various drawbacks including their complex fabrication steps, inflexibility, lack of porosity and biofunctionality, and requirement of expensive reagents. The current standard practice involves the use of autografts and allografts for bone defects. Patient's own bone can be used for grafts or donor bone tissue can be transplanted for repair of damaged regions. There are, however, a number of limitations to the existing materials and practices, which must be addressed for successful treatment. Drawbacks include high morbidity, infection risk, immune rejection, weak osteoinductivity, and limited availability of donors. Under suboptimal conditions, the currently available options also fail to adequately enhance the natural healing mechanisms. Due to these unmet clinical needs, newly specialized and novel biomaterials such as hydrogels and respective prepolymer compositions are needed, for example, for the repair and regeneration of bone.

Traditional synthetic biomaterials are expensive, difficult and laborious to fabricate, and require multistep procedures and long optimization protocols for fabricating scaffolds/constructs that can be potentially used as implants. Further, traditional synthetic scaffolds face biocompatibility problems and their mechanical properties can be insufficient for load-bearing applications. They also typically are not sufficiently porous, osteoinductive (directs differentiation of cells into bone lineage) and osteoconductive (allowing bone to grow on a surface). They further are typically not readily degradable and do not contain minerals similar to native mineralized tissues. Thus, there is need for hydrogels that are simple, flexible, porous, and mechanically stable, and that can enable tissue formation and regeneration as well as improvement of mineralization.

SUMMARY

Hydrogels including micronized and/or nanosized eggshell particles, corresponding prepolymer compositions, methods of forming and using these hydrogels are described.

One embodiment is a prepolymer composition for forming a hydrogel comprising a hydrogel forming polymer and micronized and/or nanosized eggshell particles.

Another embodiment is hydrogel comprising a crosslinked hydrogel forming polymer and micronized eggshell particles embedded throughout the crosslinked hydrogel forming polymer.

Yet another embodiment is a method of preparing a hydrogel, comprising forming a prepolymer composition described herein, and crosslinking the prepolymer composition.

Yet another embodiment is a method of treating a defect in a subject, comprising applying a hydrogel described herein to an area which exhibits the defect.

Yet another embodiment is a delivery system for small molecules, comprising a hydrogel described herein, wherein the hydrogel contains the small molecules.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 1D shows the calcium phosphate portion of the ESP-reinforced hydrogels which was fluorescently stained green.

FIG. 1E shows the Fourier-transform infrared spectroscopy (FT-IR) for the gelatin-based hydrogels with increasing amounts of ESP.

FIG. 1F shows the inductively coupled plasma optical emission spectrometry (ICP-OES) for detection of elements in ESP.

FIGS. 6A and 6B show the SEM images of the ESP for the particle morphology and the surface roughness.

FIGS. 6C and 6D show the SEM images of the pristine GelMA hydrogel demonstrating the uniform pores and pore size.

FIGS. 6E and 6F show the SEM images of the ESP-reinforced GelMA hydrogel demonstrating the porous structure of GelMA hydrogel, the interaction of GelMA and ESP, and the surface modification of ESP.

FIGS. 6G and 6H show the SEM images of the ESP-reinforced GelMA with cell encapsulation. The pre-osteoblasts were encapsulated well in GelMA hydrogel and spread on the surface of ESP. The mineral deposition secreted by the cells showed the cell differentiation.

DETAILED DESCRIPTION

Figure 1A:
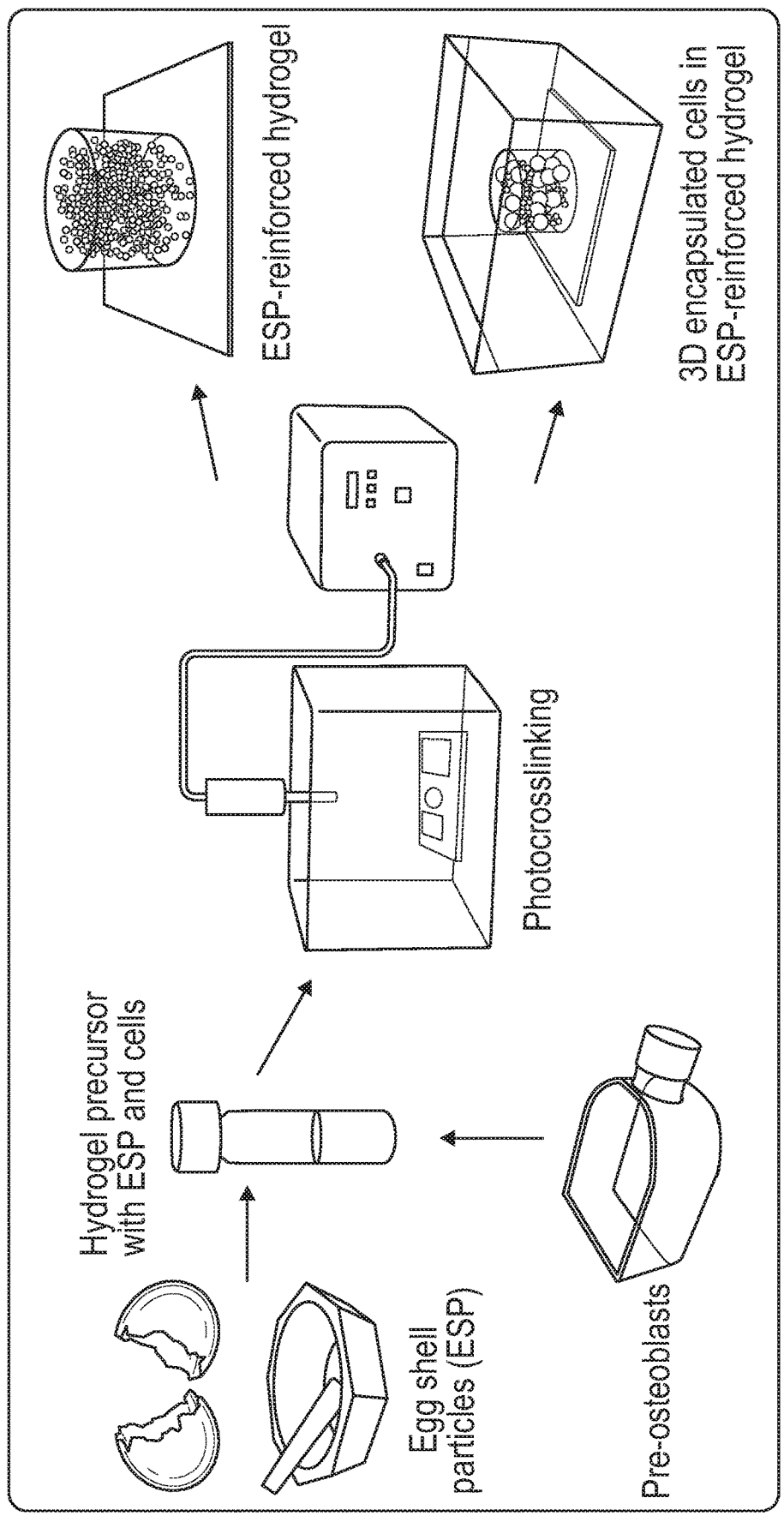
FIG. 1A shows the fabrication of the ESP-reinforced hydrogels and cell encapsulation in 3D.
Figure 1B:
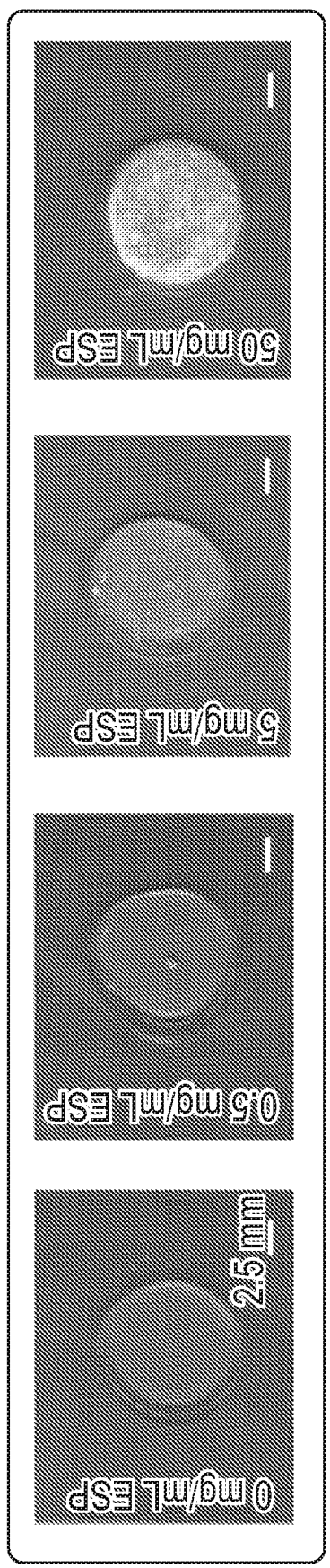
FIG. 1B shows the gelatin-based hydrogels with varying quantities of ESP (0 mg/ml, 0.5 mg/ml, 5.0 mg/ml and 50 mg/ml).
Figure 1C:
FIG. 1C shows the calcium portion of the ESP-reinforced hydrogels which was stained with alizarin red.

A description of example embodiments follows.

Hydrogels including micronized eggshell particles, nanosized eggshell particles or a combination of micronized and nanosized eggshell particles, corresponding prepolymer compositions, methods of forming and using these hydrogels are described. The hydrogels have outstanding tunability in physical, chemical, and biological properties, and have favorable properties for biomedical applications. They enable tissue formation and regeneration and are suitable for applications involving mineralized tissues such as bone, cartilage, tooth, and tendon, as well as other soft and hard tissues, such as muscle, skin, neural, vascular, cranial, maxillofacial, and connective tissues.

Prepolymer compositions according to embodiments described herein, are suitable for forming hydrogels. Typically, this is achieved by crosslinking the hydrogel forming polymer.

In embodiments, the hydrogel forming polymer can be photocrosslinked, for example, by use of a conventional photoinitiator and ultraviolet (UV) light exposure.

Embodiments of the hydrogels can be formed from prepolymer compositions by crosslinking, for example, photocrosslinking of chemical groups of a hydrogel forming polymer to form a crosslinked, for example, photo-crosslinked hydrogel forming polymer. In addition to photocrosslinkable hydrogel forming polymers, also ionically crosslinkable, temperature-dependent crosslinkable, pH dependent crosslinkable polymers, or chemically crosslinkable hydrogel forming polymers can be used.

In addition to photocrosslinking, the hydrogel forming polymer and scaffolds comprising the hydrogels can be prepared by ionic crosslinking, pH-induced crosslinking, temperature-induced crosslinking, or other techniques known in the art.

A first embodiment of a prepolymer composition for forming a hydrogel includes a hydrogel forming polymer and micronized eggshell particles, nanosized eggshell particles or combination of micronized eggshell particles and nanosized eggshell particles.

As used herein, "micronized" refers to the reduction of average particle size to the micrometer range (i.e., from 1 µm to 1000 µm). Accordingly, "micronized eggshell particles" refers to eggshell particles characterized by an average diameter in the micrometer range.

As used herein, "nanosized" refers to the reduction of average particle size to the nanometer range (i.e., from 1 nm to 1000 nm). Accordingly, "nanosized eggshell particles" refers to eggshell particles characterized by an average diameter in the nanometer range.

Reference herein to "eggshell particles" refers to micronized eggshell particles, nanosized eggshell particles or combination of micronized and nanosized eggshell particles.

The average size of the micronized eggshell particles can be, for example, between about 1 µm and about 500 µm, between 1 µm to about 200 µm, between about 10 µm and about 200 µm, between about 10 µm and about 150 µm, between about 15 µm and about 100 µm, between about 20 µm and about 100 µm, between about 25 µm and about 100 µm, between about 25 µm and about 75 µm, between about 30 µm and about 75 µm, between about 1 µm and about 100 µm, between about 5 µm and about 100 µm, between about 15 µm and about 75 µm, between about 20 µm and about 75 µm, between about 25 µm and about 65 µm, between about 35 µm and about 65 µm, between about 40 µm and about 60 µm, between about 45 µm and about 55 µm, between about 47 µm and about 53 µm, or between 47 µm and 53 µm between about 201 µm and about 300 µm, between about 301 µm and about 400 µm, or between about 401 µm and about 500 µm.

The average size of the nanosized eggshell particles can be, for example, between about 1 nm and about 100 nm, between about 101 µm and about 200 nm, between about 201 µm and about 300 nm, between about 301 µm and about 400 nm, between about 401 µm and about 500 nm, between about 501 µm and about 600 nm, between about 601 µm and about 700 nm, between about 701 µm and about 800 nm, between about 801 µm and about 900 nm, or between about 901 µm and about 1000 nm.

Micronized and nanosized eggshell particles can be obtained using methods known in the art. For example, eggshell particles can be obtained by crushing and sieving using standard equipment.

The eggshells are not limited to eggshells from eggs of a particular animal; however, typically, the eggshells are chicken eggshells, duck eggshells, quail eggshells or turkey eggshells.

Eggshell particles (and micronized and/or nanosized eggshell particles) can include, among other components, eggshell membrane, calcium carbonate (e.g., about 96%), calcium phosphate, magnesium carbonate, hydroxyapatite $[Ca_{10}(PO_4)_3(OH)]$, keratin sulfate, ovocalyxin-32, collagenous and noncollagenous elements, phosphate anions, and trace elements $Si^{2+}$, $Mg^{2+}$, $Sr^{2+}$, and $Na^+$.[1-5]

Suitable hydrogel forming polymers include, but are not limited to, synthetic, naturally-derived, peptide-based, carbohydrate-based, lipid-based, and protein-based hydrogel forming polymers. For example, the hydrogel forming polymer can be gelatin, methacrylated gelatin (GelMA), other methacrylated or photolabile polymers such as hyaluronic acid, heparin, chondroitin sulfate, elastin, collagen, keratin, silk, chitin, chitosan, dextran, alginate, agarose, cellulose, lignin, starch, gluten, gellan gum, guar gum, gum arabic, albumin, casein, soy protein, zein, peptides, polynucleotides, glycosaminoglycans, polyethylene glycol, poly(propylene glycol) (PPG), poly(acrylamide), poly(acrylic acid), 2-hydroxyethyl methacrylate (HEMA), poly(N-vinyl-2-pyrrolidone), polyethylene oxide, (PEO), poly(hydroxyalkyl methacrylate), polymethyl methacrylate (PMMA), poly(lactic acid) (PLA), poly(vinyl alcohol) (PVA), N-isopropylacrylamide (NIPAAm), or Poly (3,4-ethylenedioxythiopene) (PEDOT).

Typically, suitable protein-based hydrogels contain cell binding sites and enable degradation processes through enzymatic secretion. As the hydrogel degrades, cells obtain additional space to deposit their own extracellular matrix which allows for formation of newly deposited tissue[6,7].

Other polymers suitable for use as a scaffold include, but are not limited to, bioadhesives, polycaprolactone (PCL), polyvinyl chloride, polystyrene, nylon, resins, polyurethanes, polyesters, polyhydroxyalkanoates, polyisoprenes, poly(olefins), poly(carbonates), poly (siloxanes), poly (amides), poly(ethers), poly(sulphones), or inorganic particle-reinforced versions of these polymers.

In an aspect of the first embodiment, the hydrogel forming polymer is a naturally derived or synthetic polymer.

In another aspect of the first embodiment, the hydrogel forming polymer is a polymer polypeptide-based polymer.

In another aspect of the first embodiment, the hydrogel forming polymer is methacrylated gelatin, gelatin, hyaluronic acid, heparin, chondroitin sulfate, elastin, collagen, silk, chitin, chitosan, dextran, alginate, agarose, polyethylene glycol, poly(acrylamide), 2-hydroxyethyl methacrylate (HEMA), poly(N-vinyl-2-pyrrolidone), polyethylene oxide, poly(hydroxyalkyl methacrylate), poly (lactic acid) (PLA), poly(vinyl alcohol) (PVA), or N-isopropylacrylamide (NIPAAm).

In yet another aspect of the first embodiment or any of the aforementioned aspects of the first embodiment, the micronized eggshell particles have an average size of about 47 µm to about 53 µm.

In yet another aspect of the first embodiment or any of the aforementioned aspects of the first embodiment, the composition includes at least about 1 mg/mL of the micronized eggshell particles.

In yet another aspect of the first embodiment or any of the aforementioned aspects of the first embodiment, the composition includes at least about 5 mg/mL of the micronized eggshell particles.

In yet another aspect of the first embodiment or any of the aforementioned aspects of the first embodiment, the composition further includes photoinitiator.

Suitable photoinitiators include, but are not limited to, Irgacure 2959, eosin Y, acetophenone, anisoin, anthraquinone, (benzene) tricarbonylchromium, benzil, benzoin, benzophenone, 4-benzoylbiphenyl, camphorquinone, 2-chlorothioxanthen-9-one, dibenzosuberenone, 4'-ethoxyacetophenone, ferrocene, methybenzoylformate, and thioxanthen-9-one.

In yet another aspect of the first embodiment or any of the aforementioned aspects of the first embodiment, the compositions further includes cells. Cells can be, but are not limited to, mesenchymal stem cells, embryonic stem cells, osteoblasts, pre-osteoblasts, chondrocytes, dental cells, and primary patient cells In yet another aspect of the first embodiment or any of the aforementioned aspects of the first embodiment, the compositions includes pre-osteoblasts at a cell density from about 1 million to about 10 million cells per mL of the composition.

In yet another aspect of the first embodiment or any of the aforementioned aspects of the first embodiment, the compositions further includes phosphate buffer saline.

A second embodiment is a hydrogel prepared by cross-linking the prepolymer composition of the first embodiment or any aspect thereof.

A third embodiment is a hydrogel including a crosslinked hydrogel forming polymer and micronized and/or nanosized eggshell particles embedded throughout the crosslinked hydrogel forming polymer.

In an aspect of the third embodiment, the hydrogel forming polymer is a photocrosslinked hydrogel forming polymer.

In an aspect of the third embodiment, the hydrogel forming polymer is a protein-based polymer.

In another aspect of the third embodiment or any of the aforementioned aspects of the third embodiment, the hydrogel forming polymer is gelatin, methacrylated gelatin (GelMA), other methacrylated or photolabile polymers such as hyaluronic acid, heparin, chondroitin sulfate, elastin, collagen, keratin, silk, chitin, chitosan, dextran, alginate, agarose, cellulose, lignin, starch, gluten, gellan gum, guar gum, gum arabic, albumin, casein, soy protein, zein, peptides, polynucleotides, glycosaminoglycans, polyethylene glycol, poly(propylene glycol) (PPG), poly(acrylamide), poly(acrylic acid), 2-hydroxyethyl methacrylate (HEMA), poly(N-vinyl-2-pyrrolidone), polyethylene oxide (PEO), poly(hydroxyalkyl methacrylate), polymethyl methacrylate (PMMA), poly(lactic acid) (PLA), poly(vinyl alcohol) (PVA), N-isopropylacrylamide (NIPAAm), or Poly (3,4-ethylenedioxythiopene) (PEDOT).

In yet another aspect of the third embodiment or any of the aforementioned aspects of the third embodiment, the micronized eggshell particles have an average size of about 47 μm to about 53 μm.

In yet another aspect of the third embodiment or any of the aforementioned aspects of the third embodiment, the hydrogel comprises at least about 5 mg/mL of the micronized eggshell particles.

In yet another aspect of the third embodiment or any of the aforementioned aspects of the third embodiment, cells are encapsulated within the hydrogel. Cells can be, but are not limited to, pre-osteoblasts.

In yet another aspect of the third embodiment or any of the aforementioned aspects of the third embodiment, the hydrogel comprises pre-osteoblasts at a cell density from about 0.01 million to about 100 million cells per mL of the hydrogel.

In yet another aspect of the third embodiment or any of the aforementioned aspects of the third embodiment, the hydrogel comprises pre-osteoblasts at a cell density from about 0.1 million to about 10 million cells per mL of the hydrogel.

In yet another aspect of the third embodiment or any of the aforementioned aspects of the third embodiment, the hydrogel comprises pre-osteoblasts at a cell density from about 1 million to about 10 million cells per mL of the hydrogel.

In yet another aspect of the third embodiment or any of the aforementioned aspects of the third embodiment, the hydrogel comprises pre-osteoblasts at a cell density of about 50,000 cells per mL of the hydrogel.

A fourth embodiment is a method of preparing a hydrogel. The method includes forming a prepolymer composition of the first embodiment or any aspect of the first embodiment, and crosslinking (e.g., UV photo-crosslinking) the prepolymer composition.

In embodiments, the concentration of eggshell particles in a hydrogel described herein, is chosen such that the hydrogel has a biodegradation rate which is about the same as, within about 5% of, within about 10% of, within about 15% of, within about 20% of, within about 25% of, within about 30% of, within about 35% of, within about 40% of, within about 50% of, or within about 75% of the rate of new tissue formation typical for the target site (e.g., an area of bone defect).

In further embodiments, the prepolymer compositions and hydrogels described herein (including embodiments and aspects thereof) can further comprise micronized or nano-sized bone meal powder or crushed bone particles. Bone meal powder can be provided in the formulation having an average size of about 1 nm to about 500 μm.

Yet further, in alternative embodiments the prepolymer compositions and hydrogels described herein (including embodiments and aspects thereof) can comprise micronized or nano-sized bone meal powder instead of micronized eggshell particles.

Bone meal powder is crushed powder of animal (cattle) bone, which is a commercially available product. For example, KAL brand bone meal powder is commercially available and was purchased from Amazon.

As used herein, "about" a value refers to ±5% of the value. For example, about 100 refers to all values in the range from 95 to 105, including the values 95 and 105.

Applications

In embodiments, the hydrogels described herein can be used in methods for bone regeneration and in musculoskeletal, maxillofacial, cranial, and dental applications.

In further embodiments, the hydrogels described herein can be used in methods for fabricating mineralized and gradient-presenting scaffolds for applications including cartilage, tendons, and ligaments, as well as other tissues, such as muscle, skin, neural, vascular, cranial, maxillofacial, and connective tissues.

A fourth embodiment is a method of treating a defect (e.g., of a bone) in a subject, comprising applying a hydrogel of any embodiment or aspect of embodiment described herein to an area (e.g., of the bone) which exhibits the defect.

In an aspect of the fourth embodiment, the method further includes forming a scaffold comprising the hydrogel and implanting the scaffold in the area (e.g., of the bone) which exhibits the defect. A "scaffold" as used herein is a three-dimensional (3D) template that is engineered to present desirable cellular interactions and support the formation of new functional tissues. Scaffolds can mimic the extracellular matrix of the native tissue, recapitulate the in vivo microenvironment, enable cell adhesion, growth proliferation, migration, deliver and retain cells and biochemical factors, allow for diffusion of nutrients and expressed product, and provide mechanical and biological influences to affect cell behavior. Scaffolds can also present gradient structure or behavior. Polymeric scaffolds are commonly used in tissue repair and regeneration. For example, the scaffold can be a scaffold forming polymer including, but not limited to, bioadhesive, polycaprolactone (PCL), polyvinyl chloride, polystyrene, nylon, resin, polyurethane, polyester, polyhydroxyalkanoate, polyisoprene, poly(olefin), poly(carbonate), poly (siloxane), poly(amide), poly(ether), poly(sulphone), or inorganic particle-reinforced version of any of these polymers. The scaffold can be the hydrogels described herein and can optionally comprise small molecules.

In further embodiments, the hydrogels described herein can be used as a vehicle for small molecule delivery.

A fifth embodiment is a delivery system for small molecules, comprising a hydrogel of any embodiment or aspect of embodiment described herein, wherein the hydrogel contains the small molecules.

Suitable small molecules include, but are not limited to, growth factors, proteins, peptides, genes, drugs, and therapeutic molecules.

Example

Eggshell microparticle (ESP) reinforced gelatin-based hydrogels were fabricated to obtain mechanically stable and biologically active three-dimensional (3D) constructs that can differentiate pre-mature cells into osteoblasts. Physical properties including swelling ratio, degradation, and mechanical properties of the composite hydrogels were investigated. Pre-osteoblasts were encapsulated within the ESP-reinforced hydrogels to study their differentiation and evaluate mineral deposition by these cells. The ESP reinforced gels were then subcutaneously implanted in a rat model to determine their biocompatibility and degradation behaviors. The composite hydrogels have shown outstanding tunability in physical and biological properties supporting their use for engineering mineralized tissues (e.g. bone, cartilage, tooth, tendon). These 3D scaffolds enabled differentiation of pre-osteoblast without the use of specialized osteogenic growth medium. The ESP-reinforced gels exhibited significant enhancement in mineralization by pre-osteoblasts. These behaviors are positively correlated with increasing concentrations of ESP. The results indicate that the ESP reinforced hydrogels exhibit superior mechanical properties and provide a favorable in vivo response by subcutaneous implantation in a rat model. The biomaterial is highly cell responsive, does not elicit inflammatory responses in vivo, and integrates with the host easily.

Materials

Dulbecco's phosphate buffered saline (DPBS), Minimum Essential Medium Eagle—alpha modification, fetal bovine serum (FBS), trypsin-ethylenediaminetetraacetic acid, and penicillin/streptomycin were purchased from Gibco (Thermo Fisher Scientific, Inc., Waltham, Mass.). Alamar Blue reagent was obtained from Invitrogen (Grand Island, N.Y.). 2-hydroxy-1-[4-(hydroxyethoxy)phenyl]-2-methyl-1-propanone (Irgacure 2959) was purchased from BASF Corporation (Florham Park, N.J.). Methacrylic anhydride and sodium hydroxide were purchased from Sigma-Aldrich (St. Louis, Mo.). Porcine skin-derived gelatin and Dulbecco's Phosphate Buffer Saline (DPBS) modified without calcium chloride and magnesium chloride were purchased from Sigma-Aldrich (St. Louis, Mo.). All reagents were used as received without further purification.

Preparation of the Polymer Precursors 50 mg of Irgacure 2959 was combined with 10 mL of DPBS to prepare 0.5% (w/v) photoinitiator. The solution was vortexed and then incubated at 70° C. for 5-minute intervals. Alternations were performed between heating and vortexing to fully dissolve the photoinitiator in the buffer. 5% (w/v) GelMA was prepared by combining 50 mg of GelMA (porcine skin-derived gelatin, methacrylic anhydride and sodium hydroxide were purchased from Sigma-Aldrich (St. Louis, Mo.)) with 1 mL of the photoinitiator (PI) solution. GelMA was heated and vortexed to obtain a homogeneous prepolymer solution.

Fabrication of ESP-Reinforced Hydrogels

ESP were prepared as follows: Organic chicken egg shells were washed, dried, crushed using mortar and pestle, and sieved through standard sieves. They were then washed, dried, and kept at room temperature until they were used in the experiments.

Three different ESP concentrations (0.5 mg/mL, 5 mg/mL, and 50 mg/mL) and a control group without the ESP (i.e., 0 mg/ml ESP) were prepared with GelMA to test physical and mechanical properties, swelling, and degradation. 100 µL of prepolymer solution was UV photocrosslinked at a power of 2.5 mW/cm$^2$. After crosslinking, the unreacted polymer was washed off in DPBS and the sample was stored in DPBS until use.

Scanning Electron Microscopy (SEM)

The hydrogels were fabricated as explained in the previous section. The pre-osteoblasts were encapsulated in pristine and ESP-reinforced hydrogels and cultured for 14 days. These samples were flash frozen in liquid nitrogen and then lyophilized. The samples that contained ESP particles, pristine hydrogels, ESP-reinforced hydrogels, and cell-encapsulated EPS-reinforced hydrogels were mounted on aluminum stubs using a double-sides carbon tape. Gold (Au) sputter coating was then performed on the samples. The cross-sectional morphologies of the samples were analyzed using a Field Emission Scanning Electron Microscope. The particle size distribution in the ESP particles was evaluated using NIH ImageJ software from the SEM images. The average particle size was also determined from these results.

Mechanical Testing

The ESP-based hydrogels were immersed in DPBS for 24 h. A biopsy punch was used to obtain an 8 mm size hydrogel sample for compression testing. The discharged water was removed with Kimwipes. The compression test was performed using a Dynamic Mechanical Analyzer (DMA) TA Instrument Q800. A compliance of less than or equal to 1.3 was assigned to DMA for calibration. Gels were tested for stress and strain under a controlled force of 0.1 N/min for a maximum of 2 N. Three replicates were performed for the compression testing at each concentration.

Figure 2:
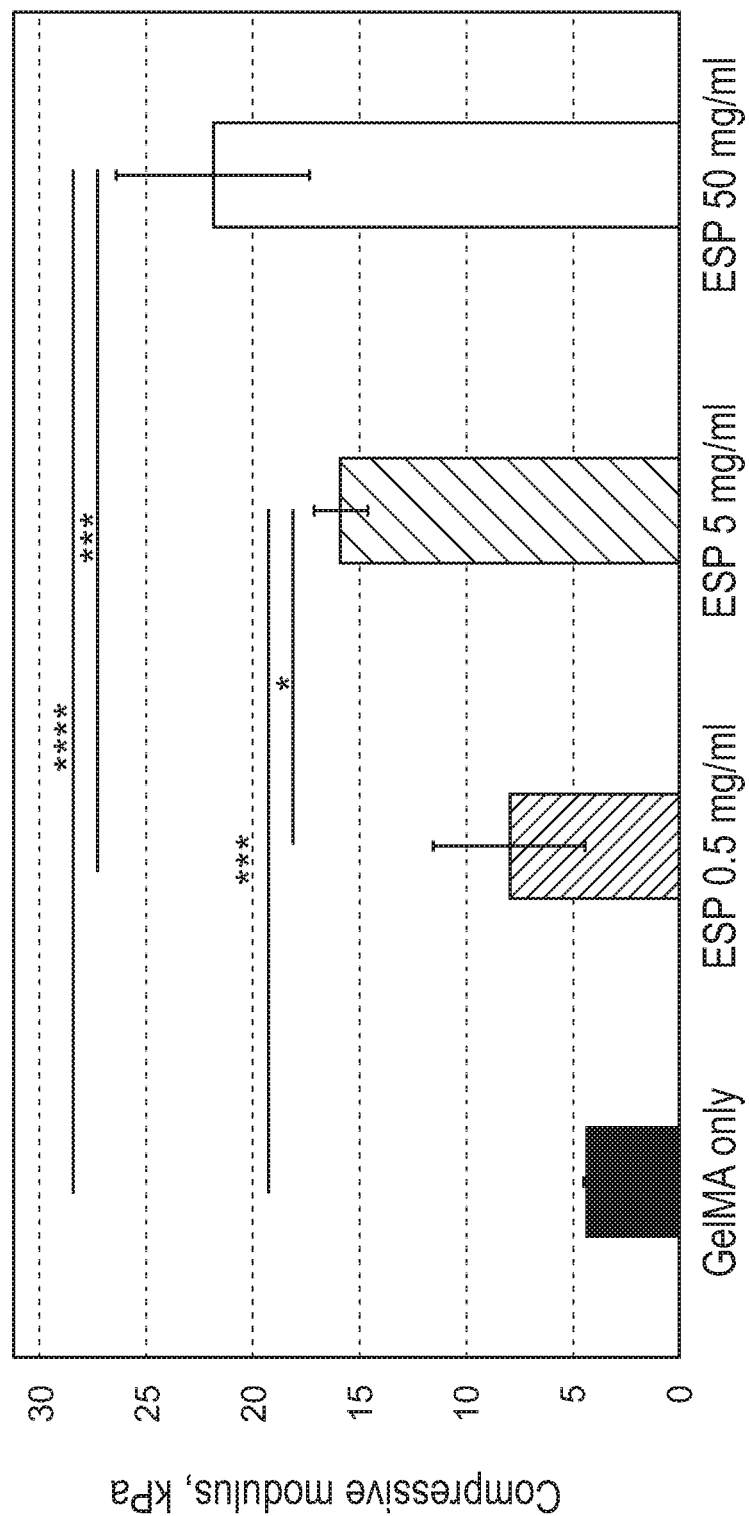
FIG. 2 shows a graph of the results of the compression test for the GelMA hydrogels reinforced with differing amounts of eggshell particles (ESP). The values of the compressive moduli increased with increasing concentrations of ESP. Statistical analyses were performed by one-way ANOVA test in GraphPad Prism 6.0 (Error bars: ±SD, * $p<0.05$, * $p<0.001$, ** $p<0.0001$).

A positive correlation between increasing ESP concentrations and compressive strength of the composite hydrogels was found. The compressive moduli of the hydrogels were found to be 4.3, 8.0, 15.9 and 21.8 kPa, containing 0, 0.5, 5, 50 mg/mL ESP respectively (see FIG. 2). The addition of increasing amounts of ESP into GelMA resulted in increased compressive moduli. The compressive strength of the hydrogels that contained 50 mg/mL ESP was significantly higher than the ones that contained 0 and 0.5 mg/mL ESP ($p<0.001$). The composite hydrogels with 5 mg/mL ESP also showed significantly higher compressive modulus than the ones with 0 and 0.5 mg/mL ESP ($p<0.05$). No significant difference in the compressive modulus was found for the hydrogels that included 0 and 0.5 mg/mL ESP, and 5 and 50 mg/mL ESP groups. The results indicate that hydrogels with 5 and 50 mg/mL ESP provide a significant enhancement to the mechanical properties of the hydrogel.

Swelling of ESP-Reinforced Hydrogels

Equilibrium swelling was reached by placement of the hydrogel discs in individual Eppendorf tubes containing 1 mL DPBS. Swelling of the hydrogel discs was allowed for 48 hours before removal from DPBS. A Kimwipe was used to remove excess liquid from the gel before determination of the wet weight. The gels were then placed in a −80° C. freezer for 48 hours, and vacuum dried for 48 hours.

Eppendorf tubes containing the dried hydrogels were weighed again to determine the dry weight of the gels. The swelling ratio was calculated by division of the wet weight by the dry weight, and the resulting number was subsequently converted to a percentage.

Figure 3:
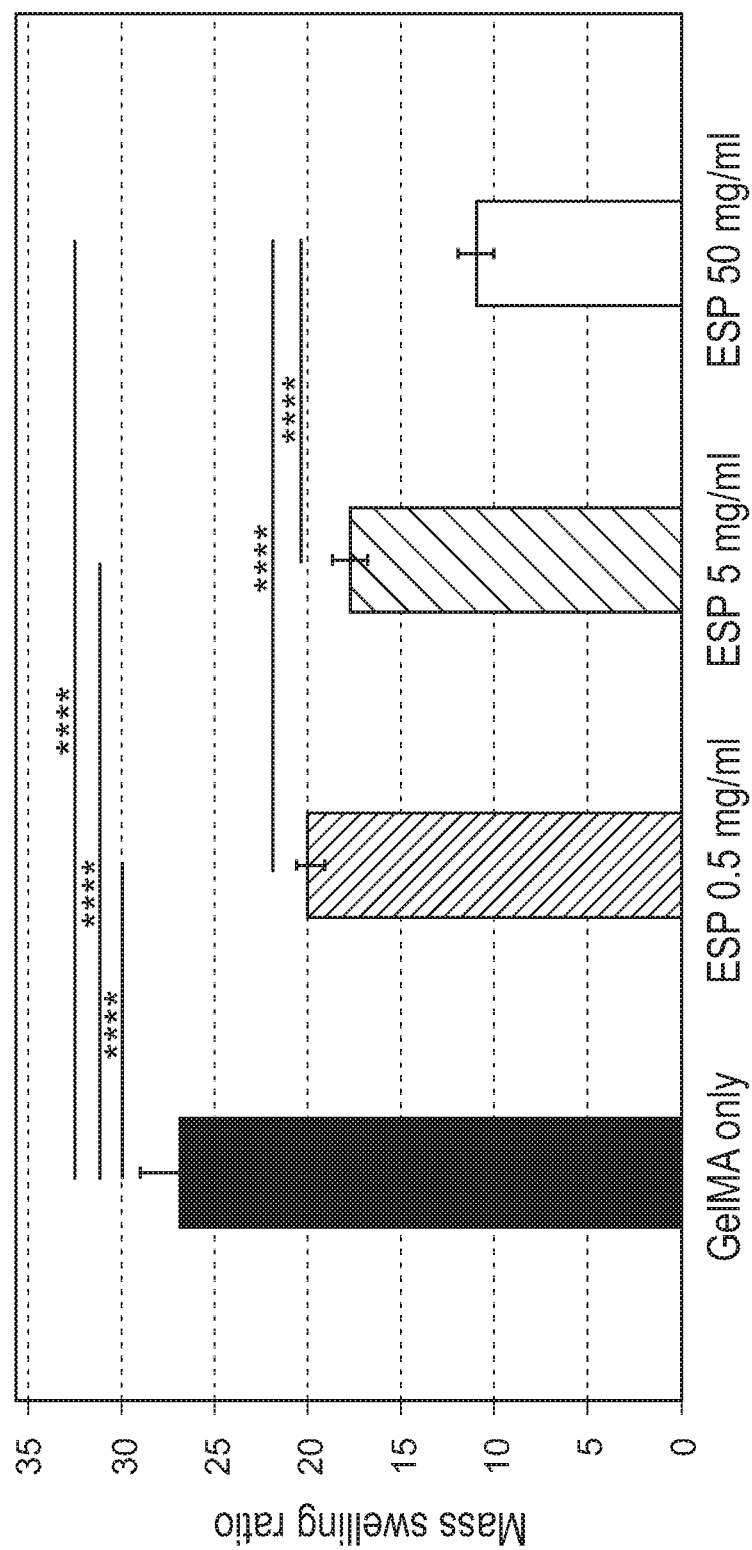
FIG. 3 shows a graph of the swelling properties of the ESP-reinforced GelMA hydrogels with differing amounts of ESP. The mass swelling ratio for the composite hydrogels decreased with increasing concentrations of ESP. One-way ANOVA was performed to determine statistical differences in GraphPad Prism 6.0 (Error bars: ±SD, **** $p<0.0001$).

Hydrogels include crosslinked networks of polymers that absorb and maintain water. Upon reaching equilibrium swelling, hydrogels contain over 90% (w/v) of water[6]. Swelling properties indicate porosity, stiffness, hydrophilicity, and stability of the hydrogels[7]. Swelling properties were studied for ESP-reinforced GelMA hydrogels at various ESP concentrations (0, 0.5, 5, 50 mg/mL). Experimental results demonstrated highly tunable swelling characteristics with addition of ESP into GelMA (see FIG. 3). The swelling ratio of the GelMA-only group was significantly higher than the other groups that included different concentrations of ESP (p<0.001). Similarly, the hydrogels that included ESP at 50 mg/mL concentration had a significantly lower swelling ratio compared to all of the other experimental groups (p<0.001). There was a decrease in the swelling ratio as the concentration of the ESP increased in the hydrogels. This result can be attributed to the decreasing amount of hydrogel with increasing amount of ESP per sample. Because there was less polymer inside the composite hydrogel at high ESP concentrations, the swelling ratio decreased. Therefore, the hydrogel possessed lowered capabilities of taking up water at increasing ESP concentrations. The results demonstrate the tunable swelling behavior of ESP-reinforced hydrogels at different concentrations of ESP.

Degradation of ESP-Reinforced Hydrogels

Excess unreacted polymer was washed from the crosslinked gels using DPBS. Gels were individually placed into Eppendorf tubes and frozen for 48 hours, followed by 48 hours of vacuum drying. Initial dry weights of the gels were obtained by weighing contents of the Eppendorf tubes. The gels then were allowed to re-swell for 24 hours in 1 mL of DPBS in the tubes. DPBS was removed after 24 hours and 0.5 mL of collagenase IV was added at 1 U/mL concentration. The enzyme was removed from the gels at different time points (1, 2, 4, 6, 8 hours). To ensure complete enzyme removal, the gels were rinsed with DPBS and placed into the freezer. The vacuum drying was then performed for 48 hours. The dried gels were then weighed again to obtain the weight of the remaining gels after the degradation process. Initial and remaining weights were used for calculation of the percent mass remaining post-degradation.

Figure 4:
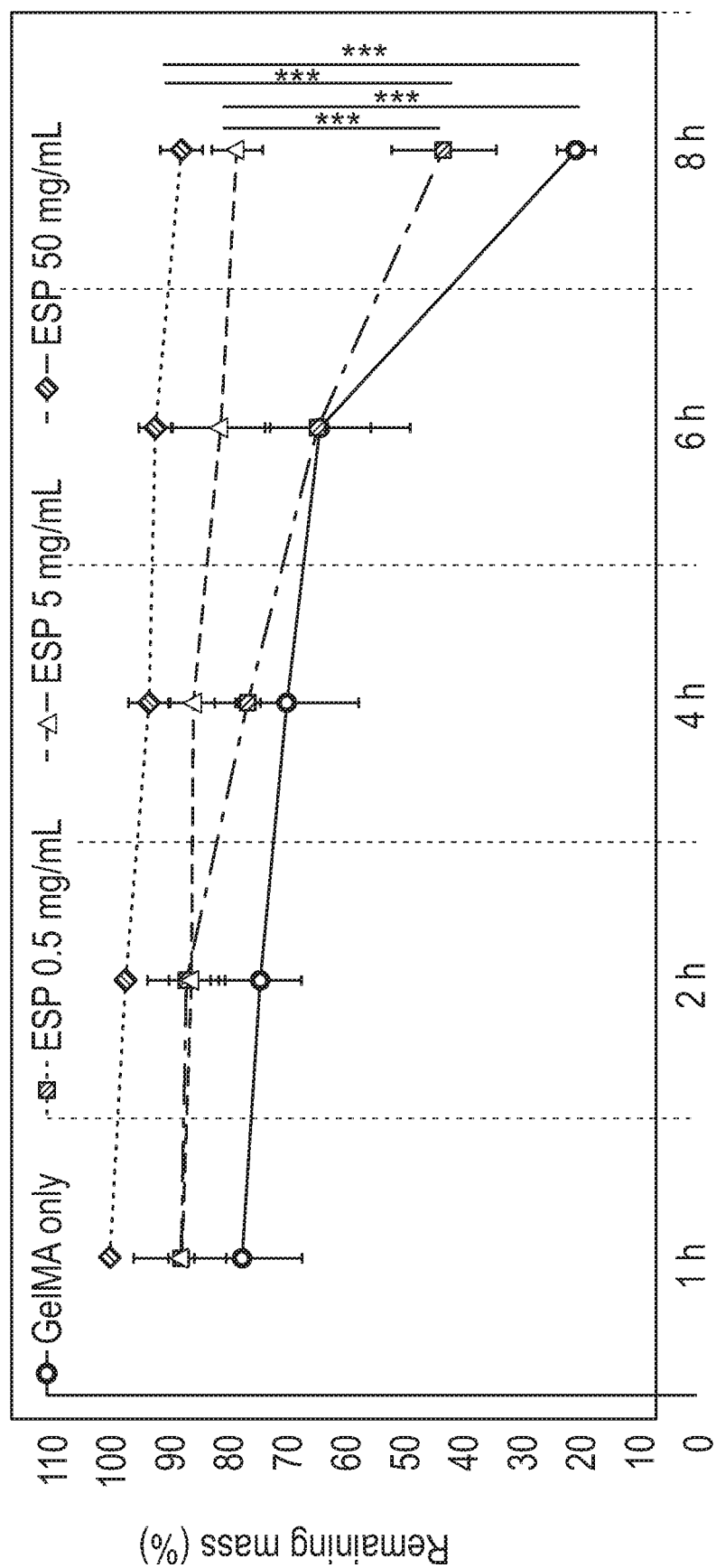
FIG. 4 shows a graph of the degradation of ESP-reinforced GelMA hydrogels, which included differing amounts of ESP, using 1 U/mL collagenase. Increasing concentrations of ESP in the hydrogels significantly lowered the degradation rate. The significant differences were determined by preforming linear regression in GraphPad Prism 6.0 (Error bars: ±SD, *** $p<0.001$).
Figure 5B:
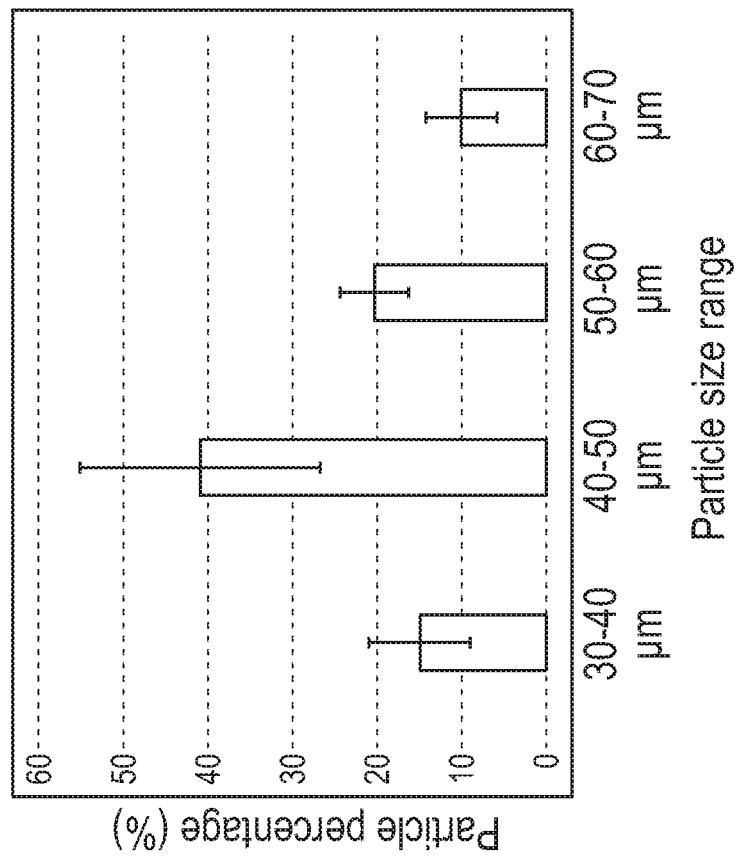
FIG. 5B shows the size distribution of ESP.
Figure 5A:
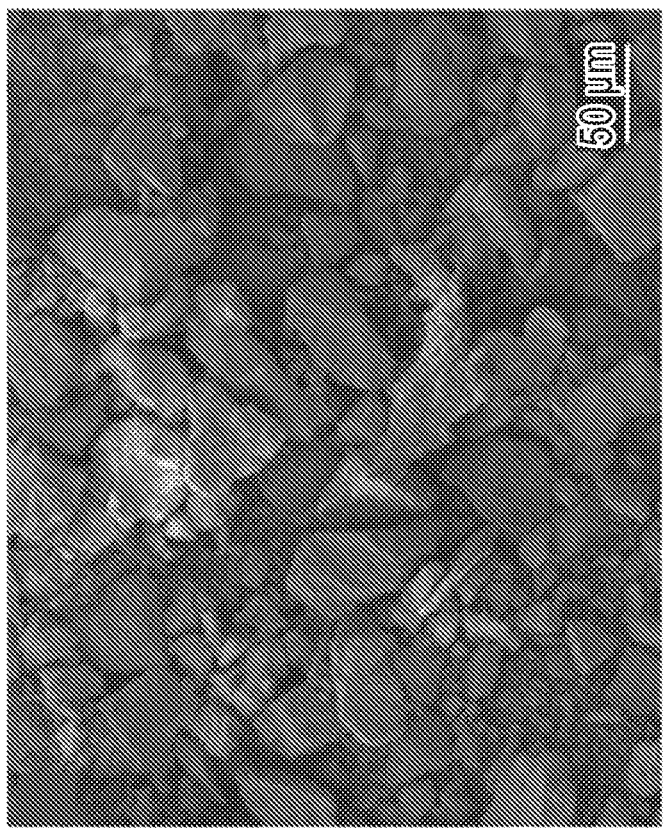
FIG. 5A shows the SEM image for gross morphology of the ESP.

The degradation behavior of ESP-reinforced hydrogels was determined in vitro using an accelerated enzymatic degradation approach. Collagenase, an enzyme that degrades collagen, was used to degrade the composite hydrogels that included different concentrations of ESP (0, 0.5, 5, 50 mg/mL) (see FIG. 4). The samples were incubated in 1 U/mL collagenase type IV at 37° C. on an orbital shaker for a duration of 8 h. At the first time point 1 h, the hydrogels that included 0 mg/mL, 0.5 mg/mL, and 5 mg/mL ESP showed weight loss, while the weight of the composite hydrogels with the highest concentration of ESP at 50 mg/mL remained the same. Post-degradation % mass was significantly higher (100% remained) for gels with 50 mg/mL ESP, compared to the GelMA-only group with a 77% remainder at 1 h (p<0.01). Remaining weight of the ESP-reinforced scaffolds decreased continuously over 2 h and 4 h of the degradation period. At 8 h, all ESP groups experienced significantly slower degradation rates compared to the GelMA-only group. After 8 h of enzymatic degradation, the GelMA-only scaffolds degraded more than 80% of their original weights, whereas the gels with 50 mg/mL ESP exhibited only 10% degradation. Differences among the groups were considered significant at 8 h, but not considered significant for the 5 mg/mL ESP vs. 50 mg/mL ESP groups (p<0.001). It was found that different concentrations of ESP in the composite hydrogels significantly influenced the degradation behavior. The findings indicate that ESP-reinforced hydrogels exhibit highly tunable degradation properties.

Cell Encapsulation in ESP-Reinforced Hydrogels in 3D

The prepolymer solution for three-dimensional (3D) cell encapsulation was prepared by dissolving 5% (w/v) GelMA and 0.5% (w/v) photoinitiator in DPBS at 70° C. Chicken eggshells were crushed, sieved, and then ground to powder consistency. The eggshell powder was sieved using standard sieving equipment to obtain average size of 47-53 µm. Three-dimensional (3D) encapsulation of pre-osteoblasts was performed at three different ESP concentrations (0.5 mg/mL, 5 mg/mL and 50 mg/mL) in GelMA hydrogels. Plain GelMA gels (0 mg/mL ESP) were used as the control. The prepolymer solution was kept in a 37° C. incubator until completion of the cell encapsulation process. MC3T3-E1 cells were cultured in α-MEM medium supplemented with 10% (v/v) FBS and 1% (v/v) penicillin/streptomycin. A humidified incubator set at 37° C. with 5% $CO_2$ supplementation was used for cell culture. Trypsinized cells were centrifuged at 1500 rpm to obtain the cell pellet. 3D cell encapsulation was performed under four different conditions: 0 mg/mL ESP, 0.5 mg/mL ESP, 5 mg/mL ESP and 50 mg/mL ESP. All cells were counted and resuspended in the prepolymer solution at 5 million cells per mL cell density for all conditions. The prepolymer solution containing cells was placed on a petri dish with a 150 µm spacer and covered with a glass slide. The sample was exposed to UV light at 2.5 mW/cm² power for 4 s to photo-crosslink the cell-laden prepolymer solution. The resulting hydrogel was then removed from the petri dish, rinsed in DPBS to remove unreacted polymer, and subsequently cultured in a 24-well plate up to 14 days. Three replicates were performed for each experimental condition.

Cell Proliferation in ESP-Reinforced Hydrogels

An Alamar Blue assay was used to assess the proliferation of cells following culture for 1, 4, 7, and 14 days. Alamar Blue solution and culture medium were mixed in a 9:1 ratio and warmed at 37° C. Subsequently, 500 µL of the mixed solution was added to each well and cells were incubated for 4 hours at 37° C. The fluorescence of the supernatant was measured with a plate reader at 560/590 nm (Ex/Em). Three replicates were performed for each condition.

Metabolic Activity of Cells in ESP-Reinforced Hydrogels

Figure 7:
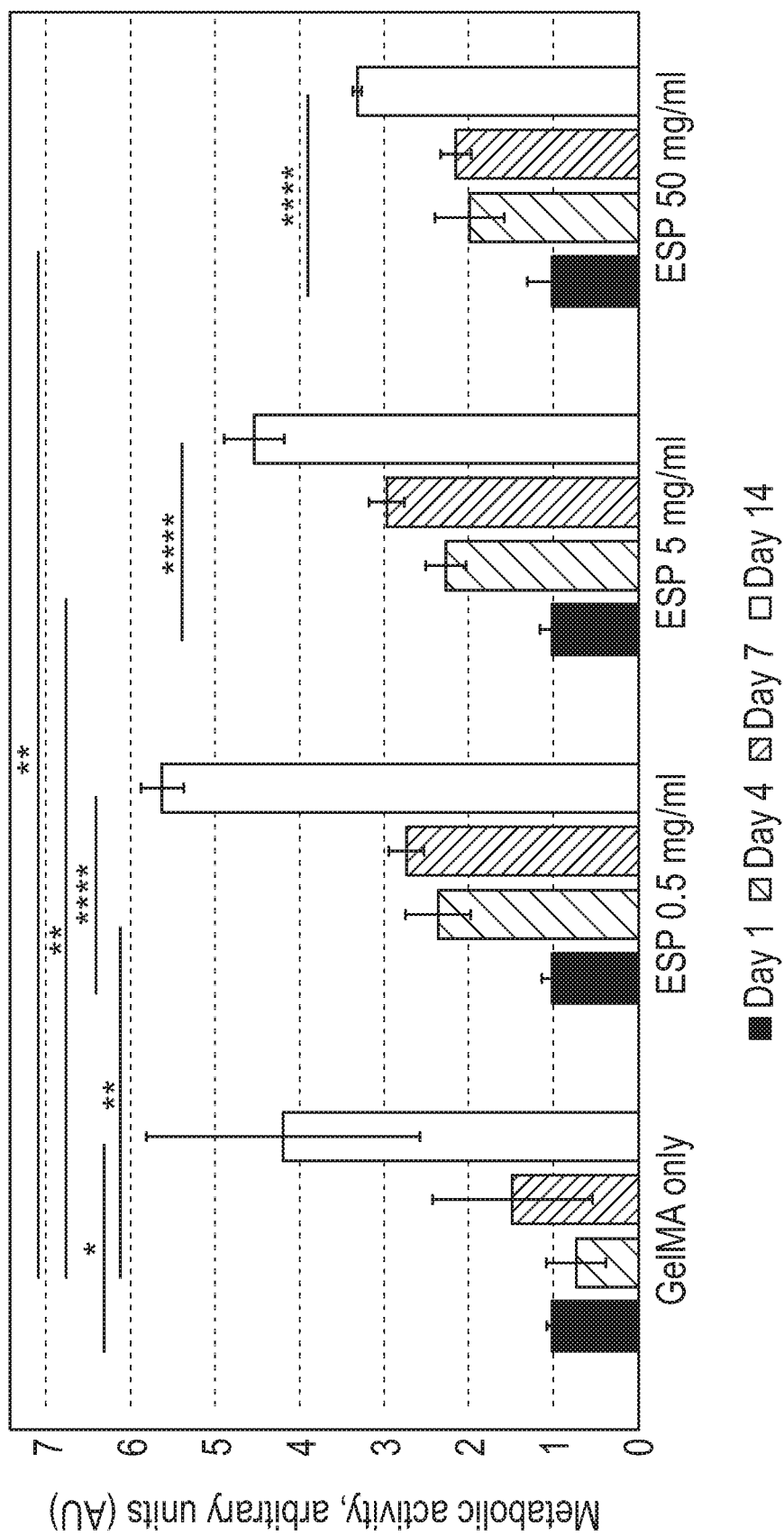
FIG. 7 shows a graph illustrating the metabolic activity of pre-osteoblasts in ESP-reinforced GelMA hydrogels was determined by an Alamar Blue analysis. The fluorescence was measured using a fluorescence plate reader at 560/590 nm (Ex/Em). Statistical analyses were performed using a one-way ANOVA test in GraphPad Prism 6.0 (Error bars: ±SD, * $p<0.05$,  $p<0.01$, ** $p<0.0001$).

An Alamar Blue assay was used to analyze the metabolic activity of MC3T3-E1 pre-osteoblast cells that were encapsulated within the ESP-reinforced hydrogels. Proliferation and metabolic activity of the cells within 3D hydrogels are crucial factors for evaluation of material biocompatibility[8]. Metabolic activity of pre-osteoblasts encapsulated in various concentrations of ESP-reinforced hydrogels (0, 0.5, 5, 50 mg/mL) were assessed at 1, 4, 7, and 14 days post-cell culture (see FIG. 7). Alamar Blue test depicted an increasing trend of metabolic activity for the pre-osteoblasts over time at each ESP concentration. Day 14 results showed that the metabolic activity significantly increased for of all groups and was significantly higher in comparison to the previous time points on days 1, 4, and 7. Overall, the metabolic activity progressively increased in all experimental groups up to day 14. The ESP-reinforced hydrogels demonstrated the suitability of this platform for cell adhesion, spreading, and growth. The results indicated that the addition of increasing concentrations of ESP provided a more favorable environment for in vitro pre-osteoblast cultures. The Alamar Blue test indicated the ability of ESP to improve metabolic activity and growth of the MC3T3-E1 cells. Therefore, ESP-reinforced hydrogels are suitable matrices for cell types of osteogenic lineage.

Alkaline Phosphatase (ALP) Activity of the Cells in ESP-Reinforced Hydrogels

ALP activity assays were performed following 1, 4, 7, and 14 days of cell culture. An ALP assay kit (Anaspec, Inc., Fremont, Calif., USA) was used according to the manufacturer's protocol to measure the activity levels of ALP, which is an exoenzyme used as an early osteogenic differentiation marker. Cells were lysed under conditions of continual disruption by pipette tip in 600 μL of lysis buffer, which was included in the ALP assay kit. The lysate was then incubated at 4° C., following centrifugation for 15 minutes at 1500 rpm. The supernatant was added to a 96-well plate treated with p-nitrophenyl phosphate disodium (Pnpp) solution. The plate was incubated at 37° C. for 1 h and then stop solution was added to each well. Absorbance levels were measured with a plate reader at 405 nm wavelength.

Figure 8:
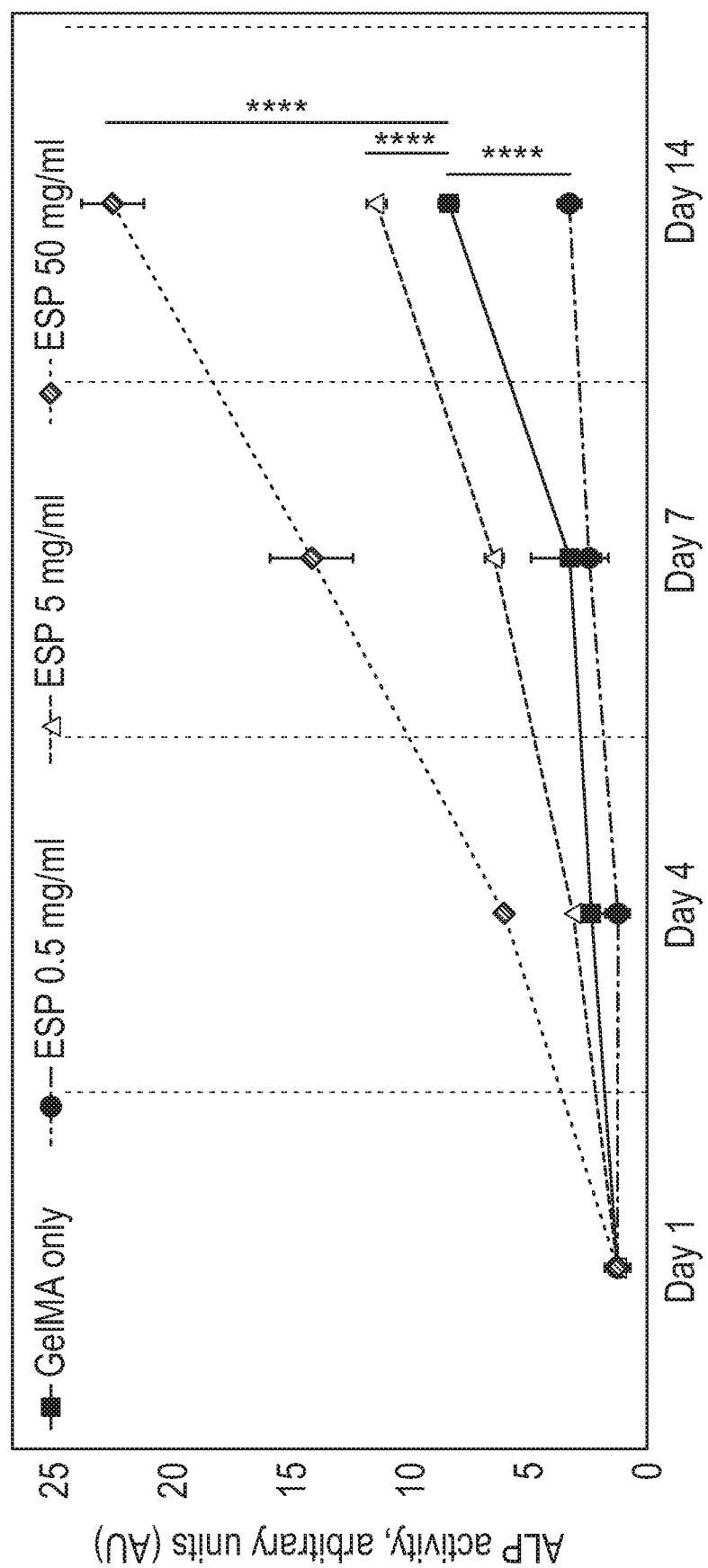
FIG. 8 shows a graph illustrating the ALP activity of the pre-osteoblasts encapsulated in GelMA hydrogels with differing amounts of ESP. The absorbance was read at 405 nm by a plate reader. The ALP activity of the scaffolds with 5 mg/mL and 50 mg/mL ESP was significantly higher than the control group (0 mg/mL ESP) at day 4, 7, and 14 as determined by a two-way ANOVA test in GraphPad Prism 6.0 (Error bars: ±SD, **** $p<0.0001$).
Figure 9B:
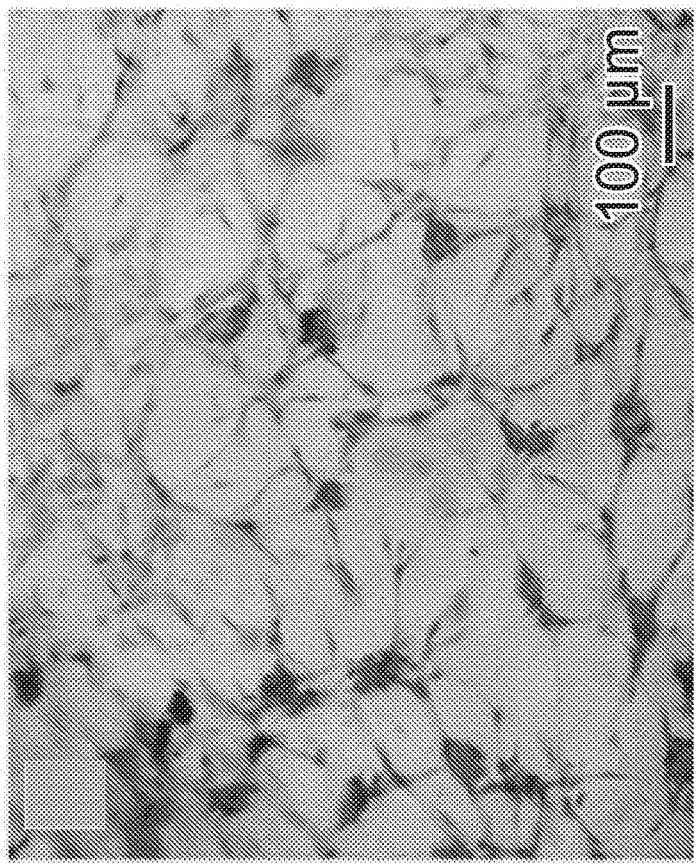
FIG. 9B shows the H&E staining of the 3D cell encapsulation in ESP-reinforced GelMA hydrogel.
Figure 9A:
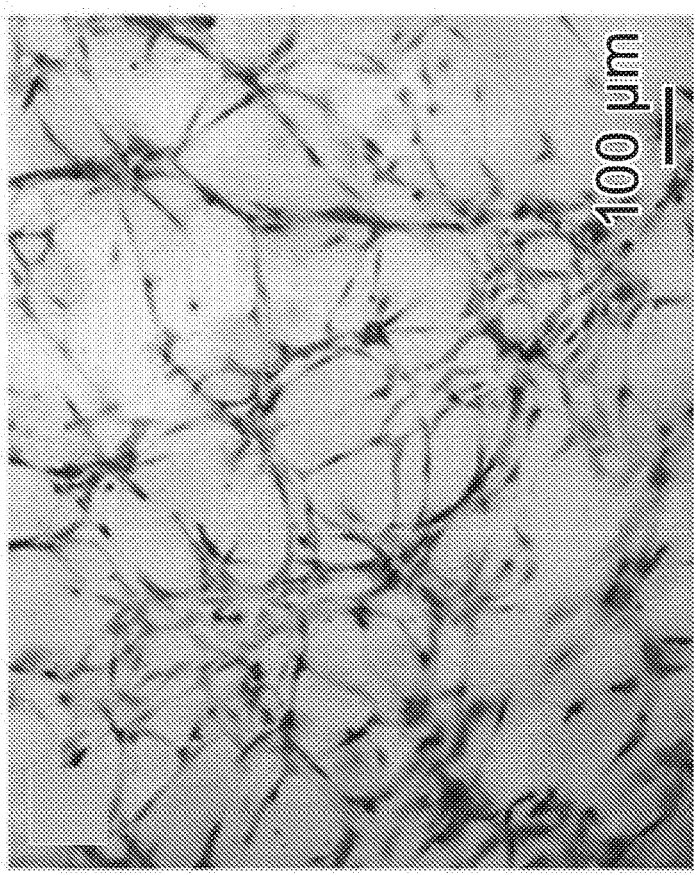
FIG. 9A shows the H&E staining of the 3D cell encapsulation in pristine GelMA hydrogel.
Figure 10B:
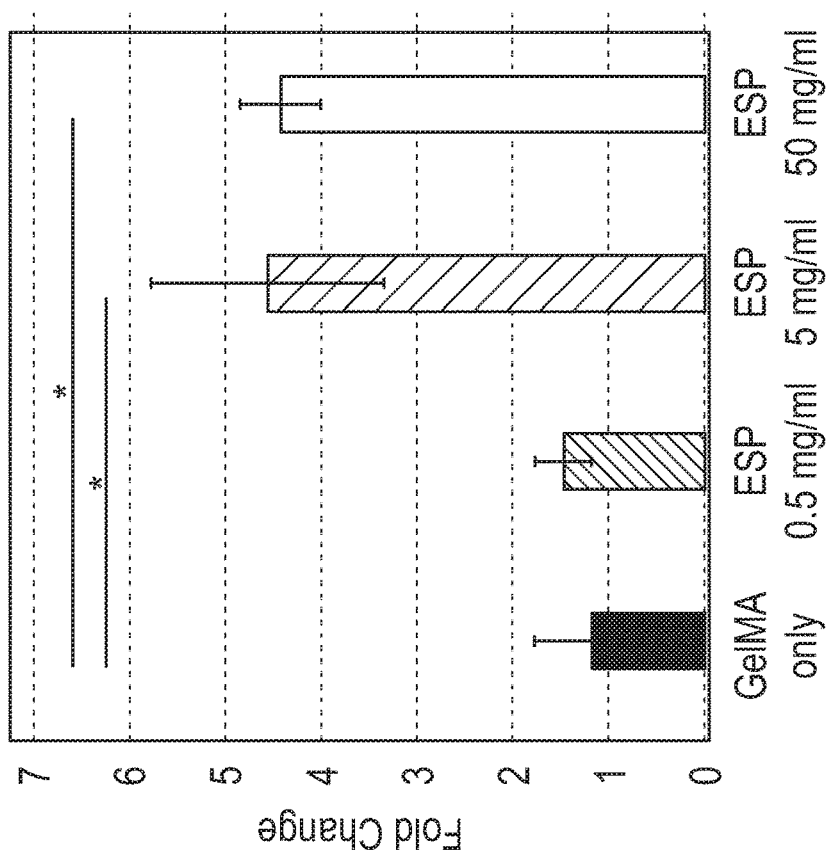
FIG. 10B shows a graph illustrating the gene expression of late osteogenic differentiation marker (Osteocalcin) for pre-osteoblasts that were encapsulated in GelMA hydrogels with different amounts of ESP after 14 days of culture. One-way ANOVA was performed in GraphPad Prism 6.0 (Error bars: ±SD, * $p<0.05$, *** $p<0.001$).
Figure 10A:
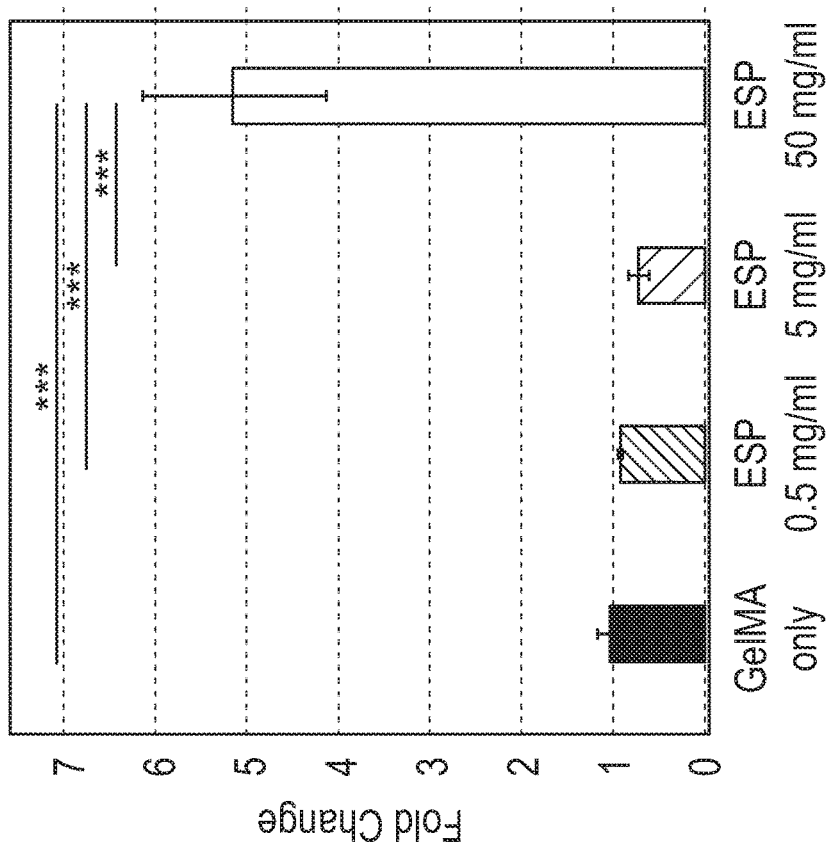
FIG. 10A shows a graph illustrating the gene expression of late osteogenic differentiation marker (BMP 7) for pre-osteoblasts that were encapsulated in GelMA hydrogels with different amounts of ESP after 14 days of culture. One-way ANOVA was performed in GraphPad Prism 6.0 (Error bars: ±SD, * $p<0.05$, *** $p<0.001$).
Figure 11B:
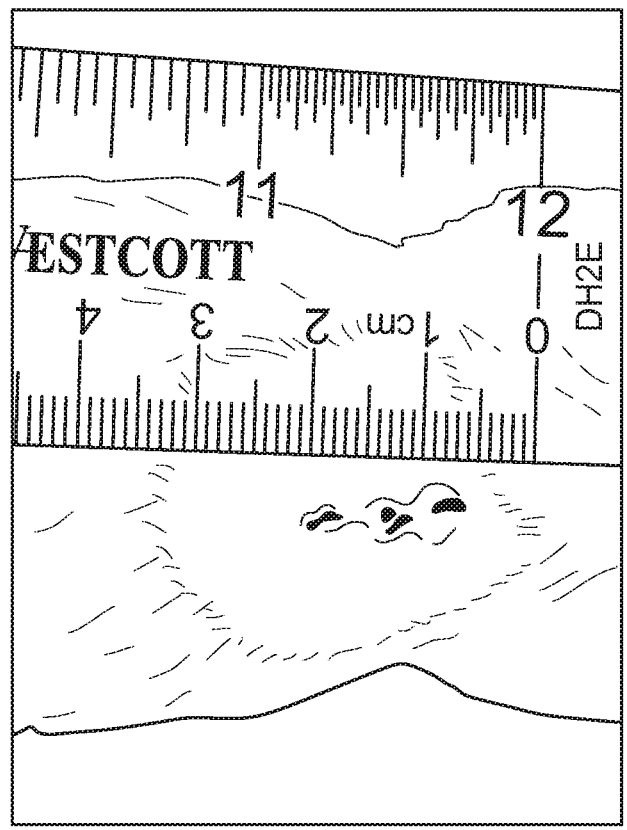
FIG. 11B shows a coalesced incision 14 days after the implantation procedure of a hydrogel scaffold into a Wistar rat model.
Figure 11A:
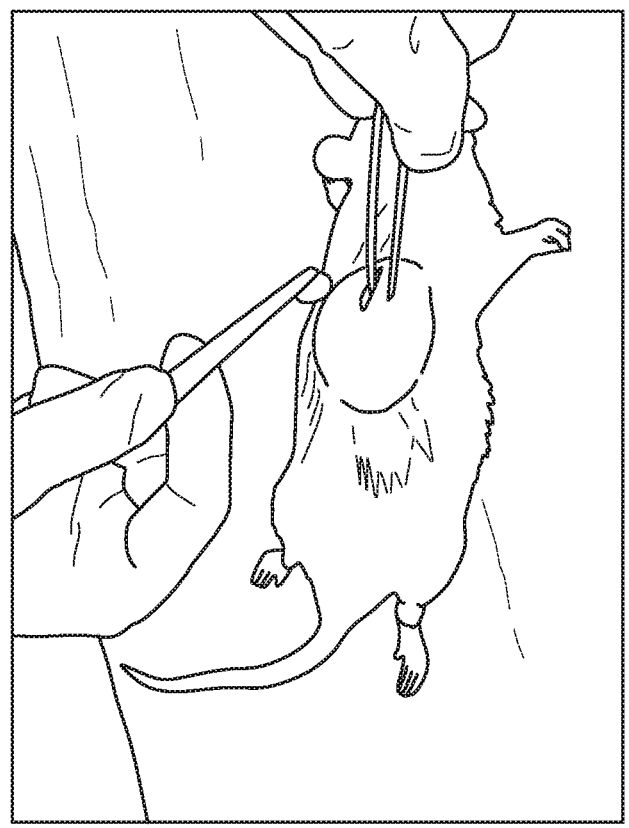
FIG. 11A shows a GelMA hydrogel scaffold (10 mm in diameter, 1 mm in thickness) before the implantation procedure into a Wistar rat model.
Figure 11D:
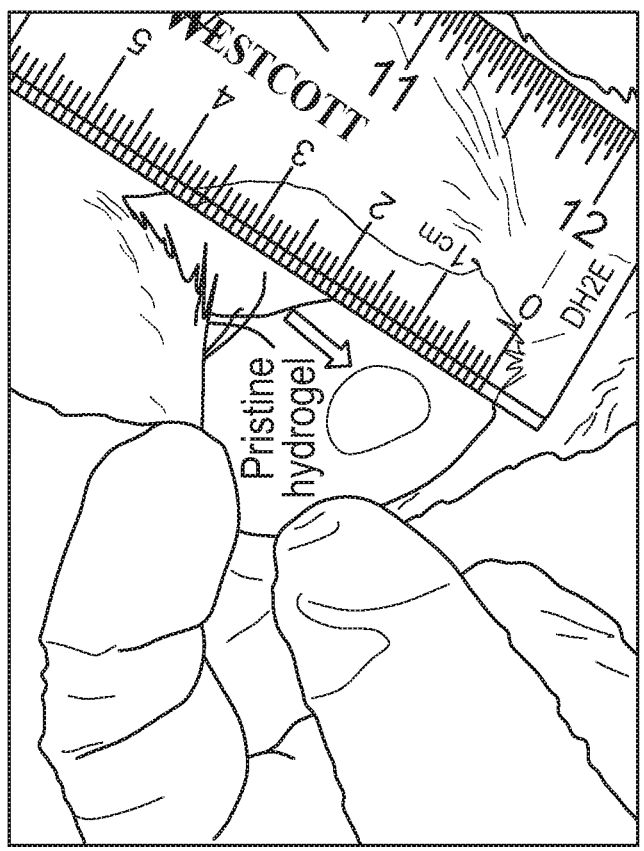
FIG. 11D shows that only 20% of the GelMA hydrogel (arrow) degraded after subcutaneous implantation for 14 days.
Figure 11C:
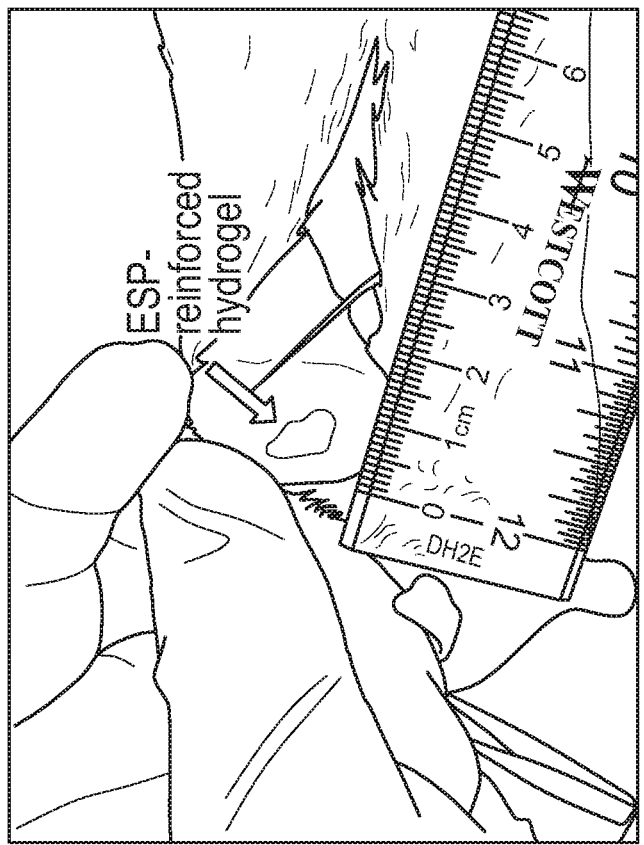
FIG. 11C shows that more than 50% of the ESP-reinforced hydrogel (arrow) degraded degraded after subcutaneous implantation for 14 days.
Figure 11E:
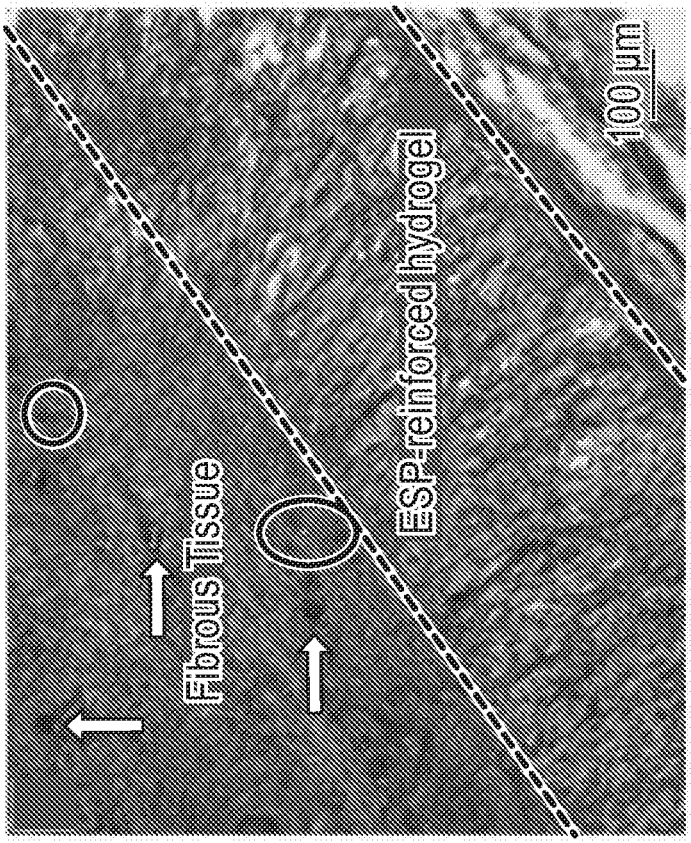
FIG. 11E shows that the hydrogel scaffolds were easily accepted by the host, encapsulated by the surrounding tissues, and quickly healed. Hematoxylin and eosin (H&E) staining for ESP-reinforced GelMA hydrogels following implantation for 14 days. The macrophages (shown by circles) and calcification (arrows) can be seen in ESP-reinforced hydrogel sample. The lymphocyte infiltration is also shown. There was no significant inflammation observed.
Figure 11F:
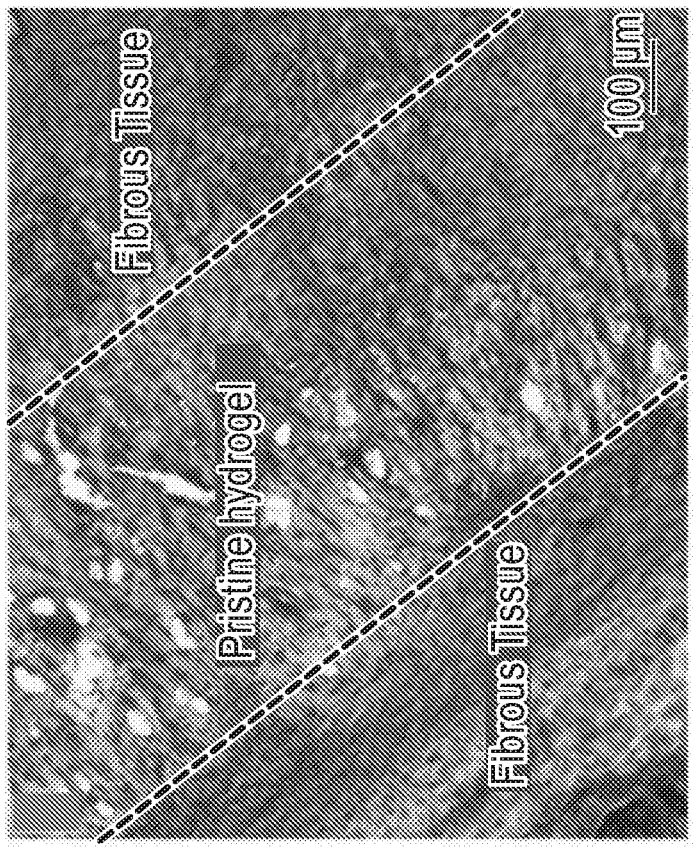
FIG. 11F shows that the hydrogel scaffolds were easily accepted by the host, encapsulated by the surrounding tissues, and quickly healed. Hematoxylin and eosin (H&E) staining for GelMA hydrogels following implantation for 14 days. Lymphocyte infiltration is shown. There was no significant inflammation observed.
Figure 12:
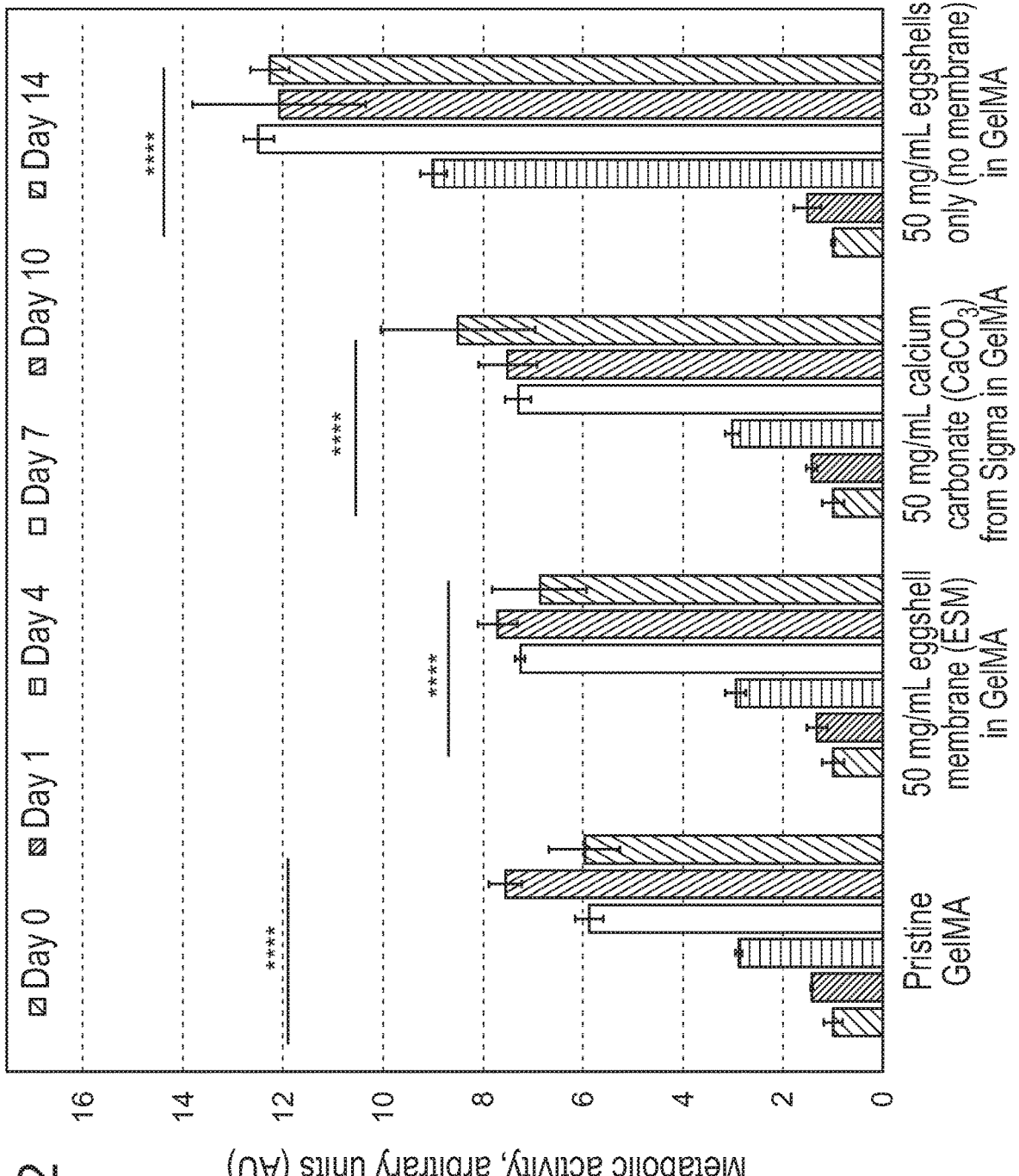
FIG. 12 shows the metabolic activity of pre-osteoblasts in pristine GelMA hydrogels (hydrogels of GelMA only), GelMA hydrogels with 50 mg/mL eggshell membrane (ESM), 50 mg/mL calcium carbonate ($CaCO_3$) purchased from Sigma, and 50 mg/mL eggshell particles without membranes that was determined by an Alamar Blue analysis. In all samples, the cell metabolic activity was significantly increase on day 14 compared with day 0. Statistical analyses were performed using a one-way ANOVA test in GraphPad Prism 6.0 (Error bars: ±SD, **** $p<0.0001$).
Figure 13:
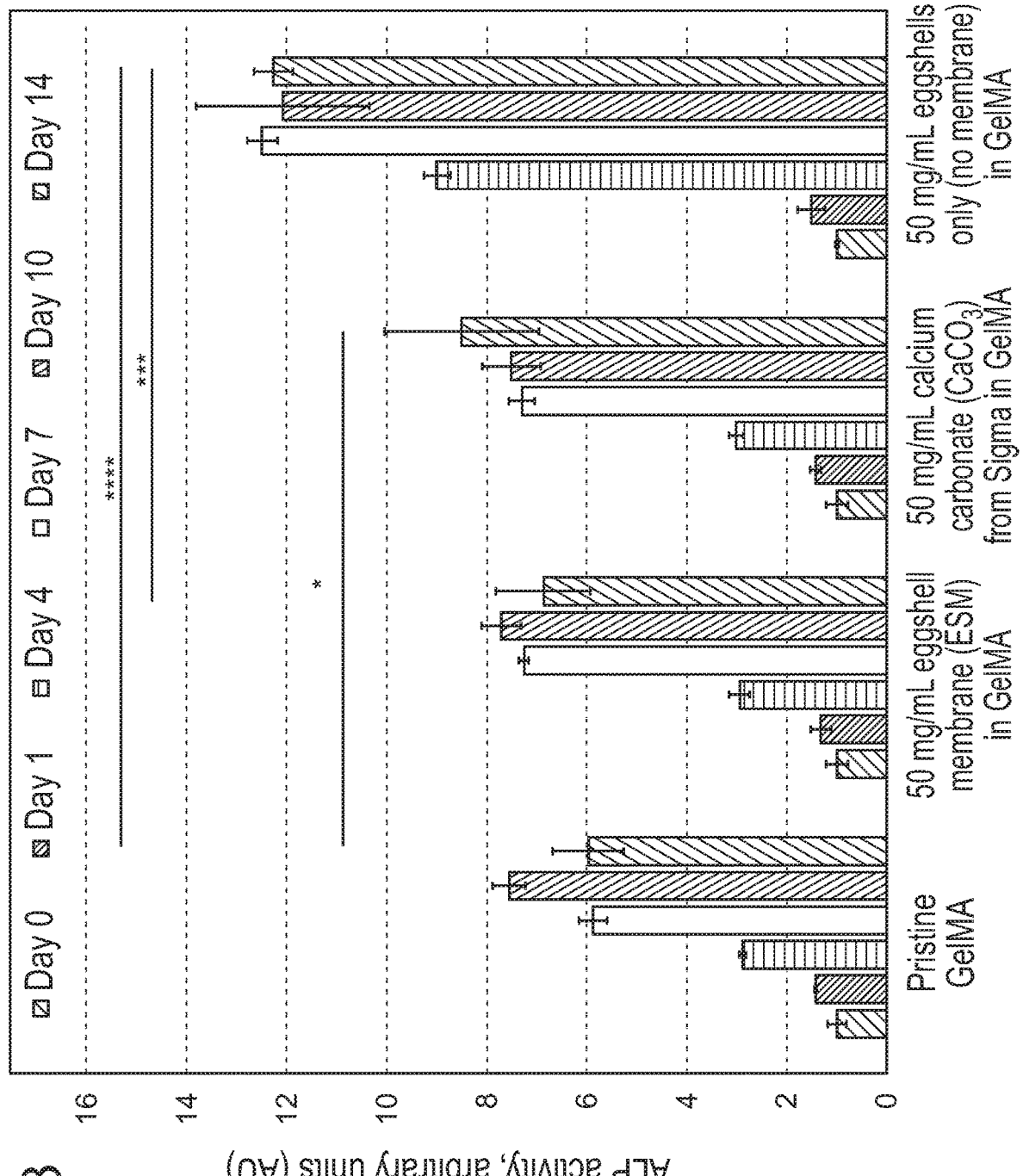
FIG. 13 shows the ALP activity of the pre-osteoblasts encapsulated in pristine GelMA hydrogels (hydrogels of GelMA only), GelMA hydrogels with 50 mg/mL eggshell membrane (ESM), 50 mg/mL calcium carbonate ($CaCO_3$) purchased from Sigma, and 50 mg/mL eggshell particles without membranes. At day 14, the ALP activity of the scaffolds with ESP, $CaCO_3$, and $CaCO_3$ from eggshells was significantly higher than the control group (pristine GelMA) as determined by a one-way ANOVA test in GraphPad Prism 6.0 (Error bars: ±SD, * $p<0.05$, * $p<0.001$, ** $p<0.0001$).
Figure 14:
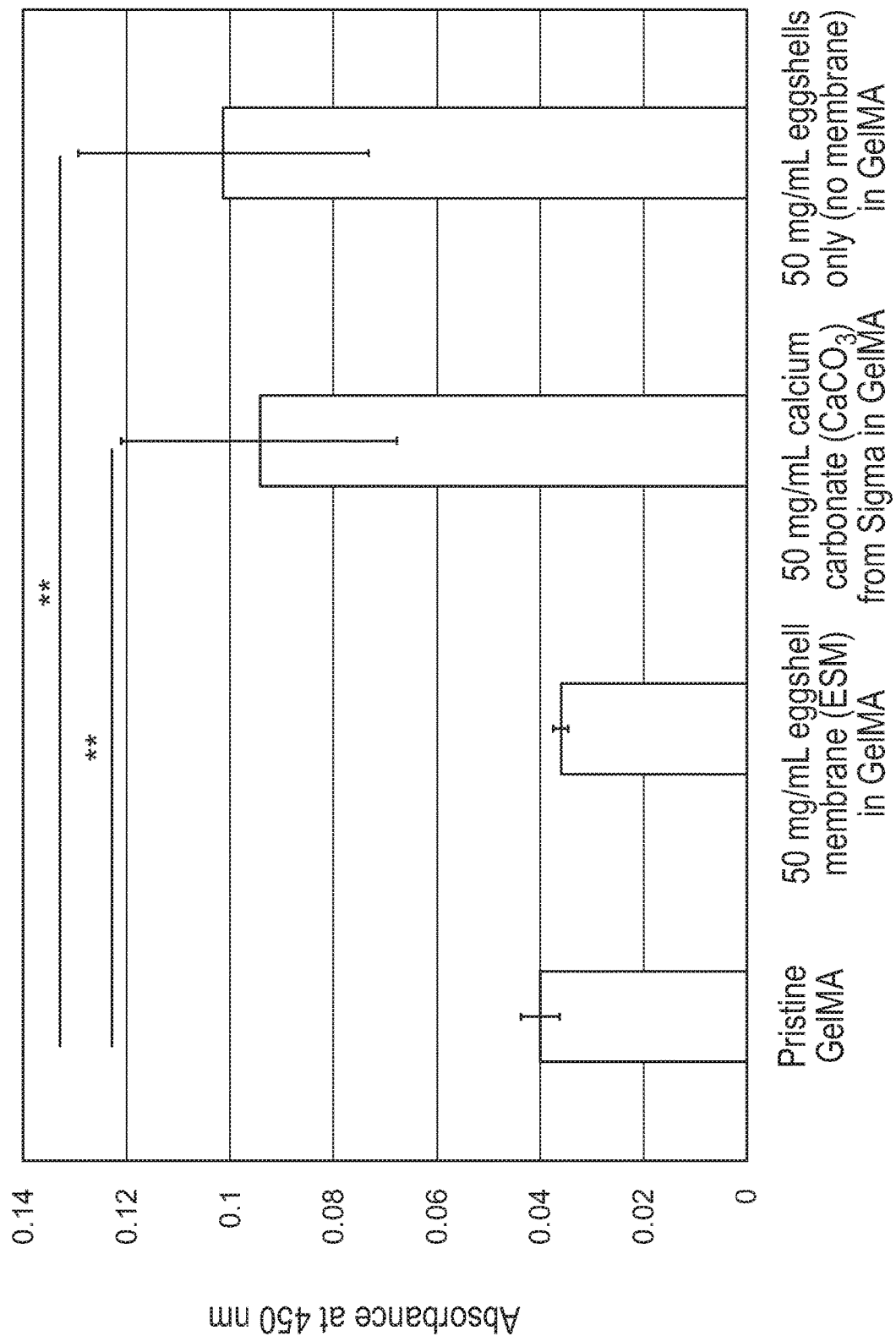
FIG. 14 shows the Osteocalcin (an osteogenic marker) secreted by pre-osteoblasts in pristine GelMA hydrogels (hydrogels of GelMA only), GelMA hydrogels with 50 mg/mL eggshell membrane (ESM), 50 mg/mL calcium carbonate ($CaCO_3$) purchased from Sigma, and 50 mg/mL eggshell particles without membranes was determined by an ELISA assay on day 14. The $CaCO_3$ from Sigma and eggshell particles without membranes showed similar osteocalcin secretion compared to the pristine GelMA and GelMA with eggshell membranes. Statistical analyses were performed using a one-way ANOVA test in GraphPad Prism 6.0 (Error bars: ±SD, ** $p<0.01$).

Alkaline phosphatase (ALP) is a marker of early differentiation for osteoblastic cells[9]. We report the ALP activity for pre-osteoblasts that were cultured in ESP-reinforced hydrogels at different concentrations of ESP (0, 0.5, 5, 50 mg/mL) up to 14 days (see FIG. 8). The ALP activity values were normalized to day 1 results. The hydrogels with 50 mg/mL ESP and 5 mg/mL ESP presented higher ALP activities than the gels with 0 and 0.5 mg/mL ESP at each time point. The ALP activity was significantly higher for all of the experimental groups compared to the control group on day 14 indicating increasing osteogenic differentiation. We achieved these results without using any osteogenic supplements in the growth medium. The presence of ESP in the hydrogel scaffolds provided a suitable environment for osteogenic differentiation. The ESP-reinforced hydrogels with 5 mg/mL ESP and 50 mg/mL ESP exhibited strong osteoinductivity behavior as shown by the enhanced ALP levels and gene expression as provided in the following section. Significantly increased ALP activity confirmed the improved differentiation of pre-osteoblasts in 5 mg/ml and 50 mg/ml ESP groups[10]. However, the composite gels that contained 0.5 mg/mL ESP did not exhibit significantly different ALP activity compared to the GelMA-only group. The amount of ESP is perhaps insufficient to demonstrate an osteoinductive effect at that concentration. The experimental results revealed that the ESP-incorporated 3D hydrogel system can induce osteogenic differentiation in a concentration dependent manner. The osteoinduction capacity without needing to use a specialized osteogenic growth medium is crucial for regeneration of mineralized tissues[11].

Expression of Osteogenic Genes in ESP-Reinforced Hydrogels

After 14 days of culture, the total RNA was extracted from the samples using the RNAqueous kit (Invitrogen) according to the manufacturer's protocol. The quality and quantity of RNA samples were evaluated by Nanodrop 2000. Verso One-Step RT-qPCR Kit, SYBR Green and Low ROX (Thermo-Fisher) were used for RT-qPCR with CFX Connect Real-Time System (Bio-Rad) according to the manufacturer's protocol. Efficiency levels and the melting curves were evaluated for all samples. GAPDH expression levels were used to normalize all target gene expression. Primers were designed and used as follows:

```
BMP-7
(Forward,
5'-TACATGGGAAACCTGGGTAAAG-3'
(SEQ ID NO: 1);

Reverse,
5'-GGTGACATTCTGTCGGGTAAA-3'
(SEQ ID NO: 2)),

Osteocalcin
(Forward,
5'-TGTGTCCTCCTGGTTCATTTC-3'
(SEQ ID NO: 3);

Reverse,
5'-CTGTCTCCCTCATGTGTTGTC-3'
(SEQ ID NO: 4)),
and

GAPDH
(Forward,
5'-CGCCCTGATCTGAGGTTAAAT-3'
(SEQ ID NO: 5);

Reverse,
5'-CGGAGCAACAGATGTGTGTA-3'
(SEQ ID NO: 6)).
```

Osteoinductivity of the ESP-reinforced hydrogels was further investigated by performing quantitative reverse transcription PCR (RT-qPCR) on messenger RNA (mRNA) that was isolated from the pre-osteoblasts after 14 days of culture period. The mRNA was tested to determine late differentiation markers of the osteoblast phenotype. Bone morphology protein 7 (BMP-7) regulates the osteoblast behavior related to the endochondral ossification[12]. Osteocalcin (OCN) is a late osteogenic differentiation marker[13,14]. Both BMP-7 and OCN are commonly analyzed to evaluate differentiation of cells into the osteogenic lineage. Hence, expressions of BMP-7 and OCN genes were examined for the pre-osteoblasts after 14 days of culture in ESP-reinforced hydrogels (see FIGS. 6A and 6B). The BMP-7 mRNA expression in the composite scaffolds with 50 mg/mL ESP was significantly higher than those with 0 mg/mL, 0.5 mg/mL, and 5 mg/mL ESP (p<0.001). Intriguingly, the levels of OCN expression in the scaffolds with 5 mg/mL and 50 mg/mL ESP were higher than those with 0.5 mg/mL ESP and GelMA-only group (p<0.05). The results indicated that the presence of 0.5 mg/mL-50 mg/mL ESP in GelMA hydrogels enhanced differentiation of pre-osteoblasts into late osteoblasts. An optimized effect for osteogenic differentiation was shown in the constructs that had 50 mg/mL ESP, in which both BMP-7 and OCN were upregulated compared to all of the remaining experimental groups. Comparison of the results between all groups revealed that the effective concentration of ESP reinforcement in GelMA is preferably greater than 5 mg/mL.

In Vivo Subcutaneous Implantation of the ESP-Reinforced Hydrogels and Histology

Male Wistar rats (100-150 g weight) purchased from Charles River Lab were used for subcutaneous implantation. The rat surgeries were conducted at the University of Massachusetts Lowell animal facility. The experimental protocol was approved by Institutional Animal Care and Use Committee (IACUC) of the University of Massachusetts Lowell. Aseptic technique was utilized throughout dorsal epithelial incisions on rats under isoflurane-based anesthesia. A subcutaneous pocket was created on the right side of the incision, whereby sterile ESP-reinforced GelMA (n=3) and plain GelMA without ESP (n=3) were inserted within. The incisions were then sealed and the rats were allowed to fully recover from anesthesia. After 14 days, rats were sacrificed via euthanasia and the hydrogels were explanted with the surrounding tissue. Explanted tissues were embedded in OCT at −80° C. Cryosectioning was performed and a 10 µm thick sample was mounted on the slide. The standard protocol was used for tissue staining (Hematoxylin/Eosin (H&E)).

The ESP-reinforced hydrogels were subcutaneously implanted under the dorsal skin in a rat model. In vivo degradation and biocompatibility were evaluated using the explanted composite hydrogels and surrounding tissues after 14 days. The size of the ESP-reinforced hydrogels and GelMA-only hydrogels pre- and post-implantation were compared (see FIGS. 11A-F). Greater bulk degradation was observed for the ESP-reinforced hydrogel compared to the GelMA-only hydrogel. This result can be attributed to the presence of ESP which provided a construct with lower hydrogel content and therefore degraded more rapidly compared to the hydrogel-only sample. Furthermore, the histology experiments via haematoxylin and eosin (H&E) staining confirmed that ESP-reinforced hydrogels degraded 50% more than the GelMA-only hydrogels (20%). The H&E staining also demonstrated that the hydrogels with and without ESP were easily accepted by the host and allowed for significant tissue infiltration in 3D in vivo.

After 6 days, the bodily response to subcutaneous implantation is considered to be in the proliferation phase, which is marked by fibrous encapsulation and invasion by macrophages[15,16]. Both the ESP-reinforced and no-ESP groups partially degraded after 14 days and the degraded space was occupied by the infiltrating tissue (see FIGS. 11E and 11F). Greater degradation and fibrous tissue infiltration were found in the ESP-reinforced hydrogels compared to the gels without ESP. Histological analyses confirmed that neither the ESP nor the no-ESP hydrogel elicited significant inflammatory responses[17] and that the newly formed tissue closely resembled adjacent dermal tissues. Minor inflammation was expected on day 14[17]. The hydrogel implants were encapsulated with fibrous tissue and blood vessels. Findings showed that fibrous tissue infiltrated the degraded regions of the gels and did not exhibit signs of necrosis. The degradation results in vitro and in vivo suggested that ESP played an important role in accelerating the degradation, particularly in vivo. Evidence showed that the surrounding tissues of the ESP-reinforced implant were more active and has more regenerative potential. H&E staining for the subcutaneously implanted composite hydrogels demonstrated biocompatibility and biodegradation.

Statistical Analysis

Statistical analyses were conducted with GraphPad Prism 6.0 (La Jolla, Calif., U.S.A.). Statistical significances in the results were determined through one-way ANOVA, two-way ANOVA, and linear regression analyses. Bonferroni post-hoc tests were performed whereby $p<0.05$ was considered to be statistically significant. Data were represented as averages±standard deviation (*$p<0.05$, $p<0.01$, *$p<0.001$, and ****$p<0.0001$).

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

REFERENCES

1. Abdulrahman, I., Hamzat Ibiyeye Tijani, Bashir Abubakar Mohammed, Haruna Saidu, Hindatu Yusuf, Mohammed Ndejiko Jibrin, and Sulaiman Mohammed: From Garbage to Biomaterials: An Overview on Egg Shell Based Hydroxyapetite. Journal of Materials (2014).
2. Naga, S. M., H. F. El-Maghraby, M. Sayed, and E. A. Saad: Highly Porous Scaffolds Made of Nanosized Hydroxyapetite Powder Synthesized from Eggshells. Journal of Ceramic Science and Technology (2015).
3. Hincke, M., Yves Nyes, Joel Gautron, Marc McKee, Alejandro B Rodriguez-Navarro & and K. Mann: The Eggshell: Structure, Composition and Mineralization. Frontiers in Bioscience (2012).
4. Yamin, A. R., and Kalyani D.: Naturally Derived Porous Hydroxyapetite/Polymer Biocomposite of Cuttlebone and Eggshell for Dental and Orthopedic Applications. International Journal for Research in Applied Science & Engineering Technology (IJRASET) 3 (2015).
5. Shih-Ching Wu, H.-K. T., Hsueh-Chuan Hsu, Shih-Kuang Hsu, Shu-Ping Liou and Wen-Fu Ho: A hydrothermal synthesis of eggshell and fruit waste extract to produce nanosized hydroxyapatite. Ceramics International 39 (2013).
6. Shi, J., M. M. Xing, and W. Zhong: Development of hydrogels and biomimetic regulators as tissue engineering scaffolds. Membranes 2, 70-90 (2012).
7. Patel, M. and J. P. Fisher: Biomaterial scaffolds in pediatric tissue engineering. Pediatric research 63, 497 (2008).
8. Nichol, J. W., S. T. Koshy, H. Bae, C. M. Hwang, S. Yamanlar, and A. Khademhosseini: Cell-laden microengineered gelatin methacrylate hydrogels. Biomaterials 31, 5536-5544 (2010).
9. Li, Z., H. R. Ramay, K. D. Hauch, D. Xiao, and M. Zhang: Chitosan-alginate hybrid scaffolds for bone tissue engineering. Biomaterials 26, 3919-3928 (2005).
10. Silva, E., L. M. R. de Vasconcellos, B. V. Rodrigues, D. M. dos Santos, S. P. Campana-Filho, F. R. Marciano, T. J. Webster, and A. O. Lobo: PDLLA honeycomb-like scaffolds with a high loading of superhydrophilic graphene/multi-walled carbon nanotubes promote osteoblast in vitro functions and guided in vivo bone regeneration. Materials Science and Engineering: C 73, 31-39 (2017).
11. Park, S.-H., E. S. Gil, H. Shi, H. J. Kim, K. Lee, and D. L. Kaplan: Relationships between degradability of silk scaffolds and osteogenesis. Biomaterials 31, 6162-6172 (2010).
12. Bauer, M., L. Kang, Y. Qiu, J. Wu, M. Peng, H. H. Chen, G. Camci-Unal, A. F. Bayomy, D. E. Sosnovik, and A. Khademhosseini: Adult cardiac progenitor cell aggregates exhibit survival benefit both in vitro and in vivo. PLoS One 7, e50491 (2012).
13. Wang, F.-S., K. Yang, Y.-R. Kuo, C.-J. Wang, S.-M. Sheen-Chen, H.-C. Huang, and Y.-J. Chen: Temporal and spatial expression of bone morphogenetic proteins in extracorporeal shock wave-promoted healing of segmental defect. Bone 32, 387-396 (2003).
14. Zhang, X., W. Chang, P. Lee, Y. Wang, M. Yang, J. Li, S. G. Kumbar, and X. Yu: Polymer-ceramic spiral structured scaffolds for bone tissue engineering: effect of hydroxyapatite composition on human fetal osteoblasts. PloS one 9, e85871 (2014).
15. Aubin, J., F. Liu, L. Malaval, and A. Gupta: Osteoblast and chondroblast differentiation. Bone 17, S77-S83 (1995).
16. Swingle, K. and F. Shideman: Phases of the inflammatory response to subcutaneous implantation of a cotton pellet and their modification by certain antiinflammatory agents. Journal of Pharmacology and Experimental Therapeutics 183, 226-234 (1972).

17. Paul, A., V. Manoharan, D. Krafft, A. Assmann, J. A. Uquillas, S. R. Shin, A. Hasan, M. A. Hussain, A. Memic, and A. K. Gaharwar: Nanoengineered biomimetic hydrogels for guiding human stem cell osteogenesis in three dimensional microenvironments. Journal of Materials Chemistry B 4, 3544-3554 (2016).

18. Todeschi, M. R., R. M. El Backly, O. P. Varghese, J. Hilborn, R. Cancedda, and M. Mastrogiacomo: Host cell recruitment patterns by bone morphogenetic protein-2 releasing hyaluronic acid hydrogels in a mouse subcutaneous environment. Regenerative medicine 12, 525-539 (2017).

What is claimed is:

1. A composition comprising a crosslinked or uncrosslinked polymer in the form of a hydrogel, and micronized eggshell particles, nanosized eggshell particles or combination of micronized eggshell particles and nanosized eggshell particles and having their unmodified eggshell membranes present, the eggshell particles and the unmodified eggshell membranes are incorporated into the polymer of the hydrogel and in an amount to reinforce the hydrogel.

2. The composition of claim 1, wherein the polymer is a naturally derived polymer, peptide-based polymer, carbohydrate-based polymer, protein-based polymer or synthetic polymer.

3. The composition of claim 1, wherein the polymer is methacrylated gelatin, gelatin, hyaluronic acid, heparin, chondroitin sulfate, elastin, collagen, keratin, silk, chitin, chitosan, dextran, alginate, agarose, cellulose, lignin, starch, gluten, gellan gum, guar gum, gum arabic, albumin, casein, soy protein, zein, peptides, polynucleotides, glycosaminoglycans, polyethylene glycol, poly (propylene glycol) (PPG), poly (acrylamide), poly (acrylic acid), 2-hydroxyethyl methacrylate (HEMA), poly (N-vinyl-2-pyrrolidone), polyethylene oxide (PEO), poly (hydroxyalkyl methacrylate), polymethyl methacrylate (PMMA), poly (lactic acid) (PLA), poly (vinyl alcohol) (PVA), N-isopropylacrylamide (NIPAAm), or Poly (3,4-ethylenedioxythiopene) (PEDOT), or methacrylated or photolabile derivatives thereof.

4. The composition of claim 1 further comprising a scaffold, wherein the scaffold comprises a polymer of the scaffold that is a bioadhesive, polycaprolactone (PCL), polyvinyl chloride, polystyrene, polyamide, resin, polyurethane, polyester, polyhydroxoalkanoate, polyisoprene, poly (olefin), poly (carbonate), poly (siloxane), poly (amide), poly (ether), poly (sulphone), wherein the polymer of the scaffold is optionally inorganic particle-reinforced.

5. The composition of claim 1, wherein when the eggshell particles are micronized then they have an average size of about 1 μm to about 500 μm and wherein when the eggshell particles are nanosized they have an average size of about 1 nm to about 1000 nm.

6. The composition of claim 1, comprising at least about 1 mg/mL of the eggshell particles.

7. The composition of claim 1, wherein the composition further comprises pre-osteoblasts at a cell density from 1 million to 100 million cells per mL of the composition.

8. The composition of claim 1, further comprising cells.

9. The composition of claim 8, wherein the cells are encapsulated within the polymer.

10. The composition of claim 8, wherein the cells are mesenchymal stem cells, embryonic stem cells, osteoblasts, pre-osteoblasts, chondrocytes, dental cells or primary patient cells.

11. The composition of claim 1, wherein the polymer is an uncrosslinked polymer.

12. The composition of claim 1, wherein the polymer has been crosslinked by photoinitiator, ionic initiator, chemical initiator, pH initiator, or temperature initiator.

13. The composition of claim 1, wherein the polymer is a photocrosslinkable polymer, ionically crosslinkable polymer, temperature-dependent crosslinkable polymer, pH dependent crosslinkable polymer, or chemically crosslinkable polymer.

14. The composition of claim 1, further comprising micronized or nano-sized bone meal powder or crushed bone particles.

15. A delivery system for small molecules, comprising the composition of claim 1, and further comprising small molecules.

16. A method of preparing a composition of claim 1 comprising crosslinked polymer in the form of a hydrogel and micronized eggshell particles, nanosized eggshell particles or combination of micronized eggshell particles and nanosized eggshell particles and having their unmodified eggshell membranes present, the method comprising: providing a crosslinkable polymer and micronized eggshell particles, nanosized eggshell particles or combination of micronized eggshell particles and nanosized eggshell particles and unmodified eggshell membranes; and crosslinking the polymer to form the composition.

17. A method of treating a defect in a subject, comprising applying a composition of claim 1 to an area which exhibits the defect.

18. The method of claim 17, wherein the composition is implanted in the area.

19. An eggshell particle reinforced hydrogel scaffold, comprising:
a crosslinked or uncrosslinked polymer in the form of a hydrogel, and micronized eggshell particles, nanosized eggshell particles, or combination of micronized eggshell particles and nanosized eggshell particles, and having their unmodified eggshell membranes incorporated into the polymer of the hydrogel scaffold,
wherein the amount of eggshell particles and unmodified eggshell membranes supports cell adhesion and cell proliferation in the presence of cells.

20. The eggshell particle reinforced hydrogel scaffold of claim 19, wherein the hydrogel forming polymer is methacrylated gelatin, gelatin, hyaluronic acid, heparin, chondroitin sulfate, elastin, collagen, keratin, silk, chitin, chitosan, dextran, alginate, agarose, cellulose, lignin, starch, gluten, gellan gum, guar gum, gum arabic, albumin, casein, soy protein, zein, peptides, polynucleotides, glycosaminoglycans, polyethylene glycol, poly (propylene glycol) (PPG), poly (acrylamide), poly (acrylic acid), 2-hydroxyethyl methacrylate (HEMA), poly (N-vinyl-2-pyrrolidone), polyethylene oxide (PEO), poly (hydroxyalkyl methacrylate), polymethyl methacrylate (PMMA), poly (lactic acid) (PLA), poly (vinyl alcohol) (PVA), N-isopropylacrylamide (NIPAAm), or Poly (3,4-ethylenedioxythiopene) (PEDOT), or methacrylated or photolabile derivatives thereof.

21. The eggshell particle reinforced hydrogel scaffold of claim 20, further comprising cells within the hydrogel scaffold, wherein the cells are mesenchymal stem cells, embryonic stem cells, osteoblasts, pre-osteoblasts, chondrocytes, dental cells or primary patient cells.

22. A composition comprising a crosslinked or uncrosslinked polymer that forms a hydrogel scaffold and also comprising micronized eggshell particles, nanosized eggshell particles, or combination of micronized eggshell particles and nanosized eggshell particles, and unmodified eggshell membranes incorporated into the polymer of the hydrogel scaffold, wherein the eggshell particles and the unmodified eggshell membranes provide nutrients present in an amount for tissue repair or regeneration of a defect in a patient;

and wherein the polymer scaffold is a bioadhesive, polycaprolactone (PCL), polyvinyl chloride, polystyrene, polyamide, resin, polyurethane, polyester, polyhydroxoalkanoate, polyisoprene, poly (olefin), poly (carbonate), poly (siloxane), poly (amide), poly (ether), poly (sulphone), wherein the polymer is optionally inorganic particle-reinforced.

23. The composition of claim 22, wherein the nutrients promote mineralization in the area of the defect.

24. The hydrogel scaffold of claim 19, further comprising pre-osteoblast cells, wherein the hydrogel scaffold promotes osteogenic differentiation at levels of at least 20% higher than a hydrogel scaffold lacking eggshell particles and unmodified eggshell membranes.

* * * * *

SEQUENCE LISTING

<160> NUMBER OF SEQ ID NOS: 6

<210> SEQ ID NO 1
<211> LENGTH: 22
<212> TYPE: DNA
<213> ORGANISM: Artificial Sequence
<220> FEATURE:
<223> OTHER INFORMATION: Bone Morphogenetic Protein 7 (BMP-7) Forward
      Primer

<400> SEQUENCE: 1
tacatgggaa acctgggtaa ag                                        22

<210> SEQ ID NO 2
<211> LENGTH: 21
<212> TYPE: DNA
<213> ORGANISM: Artificial Sequence
<220> FEATURE:
<223> OTHER INFORMATION: Bone Morphogenetic Protein 7 (BMP-7) Reverse
      Primer

<400> SEQUENCE: 2
ggtgacattc tgtcgggtaa a                                         21

<210> SEQ ID NO 3
<211> LENGTH: 21
<212> TYPE: DNA
<213> ORGANISM: Artificial Sequence
<220> FEATURE:
<223> OTHER INFORMATION: Osteocalcin Forward Primer

<400> SEQUENCE: 3
tgtgtcctcc tggttcattt c                                         21

<210> SEQ ID NO 4
<211> LENGTH: 21
<212> TYPE: DNA
<213> ORGANISM: Artificial Sequence
<220> FEATURE:
<223> OTHER INFORMATION: Osteocalcin Reverse Primer

<400> SEQUENCE: 4
ctgtctccct catgtgttgt c                                         21

<210> SEQ ID NO 5
<211> LENGTH: 21
<212> TYPE: DNA
<213> ORGANISM: Artificial Sequence
<220> FEATURE:
<223> OTHER INFORMATION: GAPDH Forward Primer

<400> SEQUENCE: 5
cgccctgatc tgaggttaaa t                                         21

<210> SEQ ID NO 6
<211> LENGTH: 20
<212> TYPE: DNA
<213> ORGANISM: Artificial Sequence
<220> FEATURE:
<223> OTHER INFORMATION: GAPDH Reverse Primer

```
<400> SEQUENCE: 6
cggagcaaca gatgtgtgta                                              20
```